US012762139B1

(12) United States Patent
Johnson et al.

(10) Patent No.: US 12,762,139 B1
(45) Date of Patent: Oct. 13, 2026

(54) ARTIFICIAL INTELLIGENCE AGENT EXECUTION USING TRIGGERS

(71) Applicant: Notion Labs, Inc., San Francisco, CA (US)

(72) Inventors: Quinn Hajime Johnson, Oakland, CA (US); Sean Keenan, San Francisco, CA (US); Eric Liu, San Francisco, CA (US); Ryan Nystrom, San Francisco, CA (US); Simon Townsend-Last, New York, NY (US)

(73) Assignee: Notion Labs, Inc., San Francisco, CA (US)

( * ) Notice: Subject to any disclaimer, the term of this patent is extended or adjusted under 35 U.S.C. 154(b) by 0 days.

(21) Appl. No.: 19/387,390

(22) Filed: Nov. 12, 2025

Related U.S. Application Data

(60) Provisional application No. 63/880,936, filed on Sep. 12, 2025, provisional application No. 63/842,703, filed on Jul. 11, 2025.

(51) Int. Cl.
*G06F 16/00* (2019.01)
*G06F 16/25* (2019.01)

(52) U.S. Cl.
CPC .................................. *G06F 16/252* (2019.01)

(58) Field of Classification Search
None
See application file for complete search history.

(56) References Cited

U.S. PATENT DOCUMENTS

| | | | | |
|---|---|---|---|---|
| 11,742,091 | B1 * | 8/2023 | Gottula | G06N 20/00 706/11 |
| 12,182,742 | B1 * | 12/2024 | Clark | G06Q 10/06316 |
| 12,346,713 | B1 | 7/2025 | Vlasceanu et al. | |
| 12,380,340 | B1 | 8/2025 | Mamut et al. | |
| 12,493,540 | B1 | 12/2025 | Fedoruk et al. | |
| 2017/0169059 | A1 * | 6/2017 | Horowitz | G06F 16/211 |
| 2019/0065993 | A1 | 2/2019 | Srinivasan et al. | |
| 2019/0198013 | A1 | 6/2019 | Hirzel et al. | |
| 2021/0173682 | A1 | 6/2021 | Chakraborti et al. | |
| 2022/0385703 | A1 | 12/2022 | Joshi et al. | |
| 2023/0052190 | A1 | 2/2023 | Goyal et al. | |
| 2024/0314168 | A1 | 9/2024 | Cohen | |
| 2024/0403112 | A1 | 12/2024 | Mohammed et al. | |

(Continued)

FOREIGN PATENT DOCUMENTS

WO 2025106745 A1 5/2025

OTHER PUBLICATIONS

Li et al. (WO-2023016537-A1), "Database Management System, Data Processing Method, and Device", Feb. 16, 2023, 42 Pages. (Year: 2023).*

*Primary Examiner* — Bai D Vu
(74) *Attorney, Agent, or Firm* — Dorsey & Whitney LLP

(57) ABSTRACT

Disclosed herein are systems, methods, and computer readable media for implementing artificial intelligence (AI) agents that are configured with automations. In some embodiments, an automation is configured for a first AI agent, with the automation including a trigger that automatically initiates a call of the first AI agent. An occurrence of the trigger may be detected and, in response, the first AI agent may be called and provided with context associated with the trigger. An output resulting from execution of the first set of instructions by the first AI agent may be received.

18 Claims, 25 Drawing Sheets

(56) References Cited

U.S. PATENT DOCUMENTS

| | | | |
|---|---|---|---|
| 2024/0403567 | A1* | 12/2024 | Dressler, II ............ H04L 51/02 |
| 2024/0404701 | A1 | 12/2024 | Bell et al. |
| 2025/0013438 | A1 | 1/2025 | Goodman et al. |
| 2025/0094465 | A1 | 3/2025 | Xu et al. |
| 2025/0139387 | A1 | 5/2025 | Jang et al. |
| 2025/0165890 | A1 | 5/2025 | Medford |
| 2025/0291583 | A1 | 9/2025 | Agarwal et al. |
| 2025/0315430 | A1 | 10/2025 | Xu et al. |
| 2025/0335443 | A1 | 10/2025 | Statton et al. |
| 2025/0348702 | A1 | 11/2025 | Aggarwal et al. |
| 2025/0348707 | A1 | 11/2025 | Myers et al. |

* cited by examiner

ARTIFICIAL INTELLIGENCE AGENT EXECUTION USING TRIGGERS

CROSS-REFERENCE TO RELATED APPLICATION(S)

This application claims priority to and the benefit of U.S. Provisional Application No. 63/880,936, titled "ARTIFICIAL INTELLIGENCE AGENT IMPLEMENTATIONS FOR A WORKSPACE APPLICATION" filed on Sep. 12, 2025, and U.S. Provisional Application No. 63/842,703, titled "ARTIFICIAL INTELLIGENCE AGENTS" filed on Jul. 11, 2025, the contents of which are herein incorporated by reference in their entireties.

BACKGROUND

Artificial intelligence (AI) refers to the capability of computational systems to perform tasks typically associated with human intelligence, such as learning, reasoning, problem-solving, perception, and decision-making. Generative AI (sometimes called Generative AI or Gen AI) is a subfield of AI that uses generative models to produce text, images, videos, or other forms of data. These models learn the underlying patterns and structures of their training data and use them to produce new data based on the input, which often comes in the form of natural language prompts.

In recent years, there has been a significant proliferation of software tools that employ AI models, including generative AI models to interpret natural language queries provided as input by a human user and return a natural language response as output. Agentic AI is a class of AI that focuses on autonomous systems that can make decisions and perform tasks with or without human intervention. The independent systems automatically respond to conditions, with procedural, algorithmic, and human-like creative steps, to produce process results.

BRIEF DESCRIPTION OF THE DRAWINGS

Reference will now be made, by way of example, to the accompanying drawings, which show example embodiments of the present application, and in which.

Figure 1:
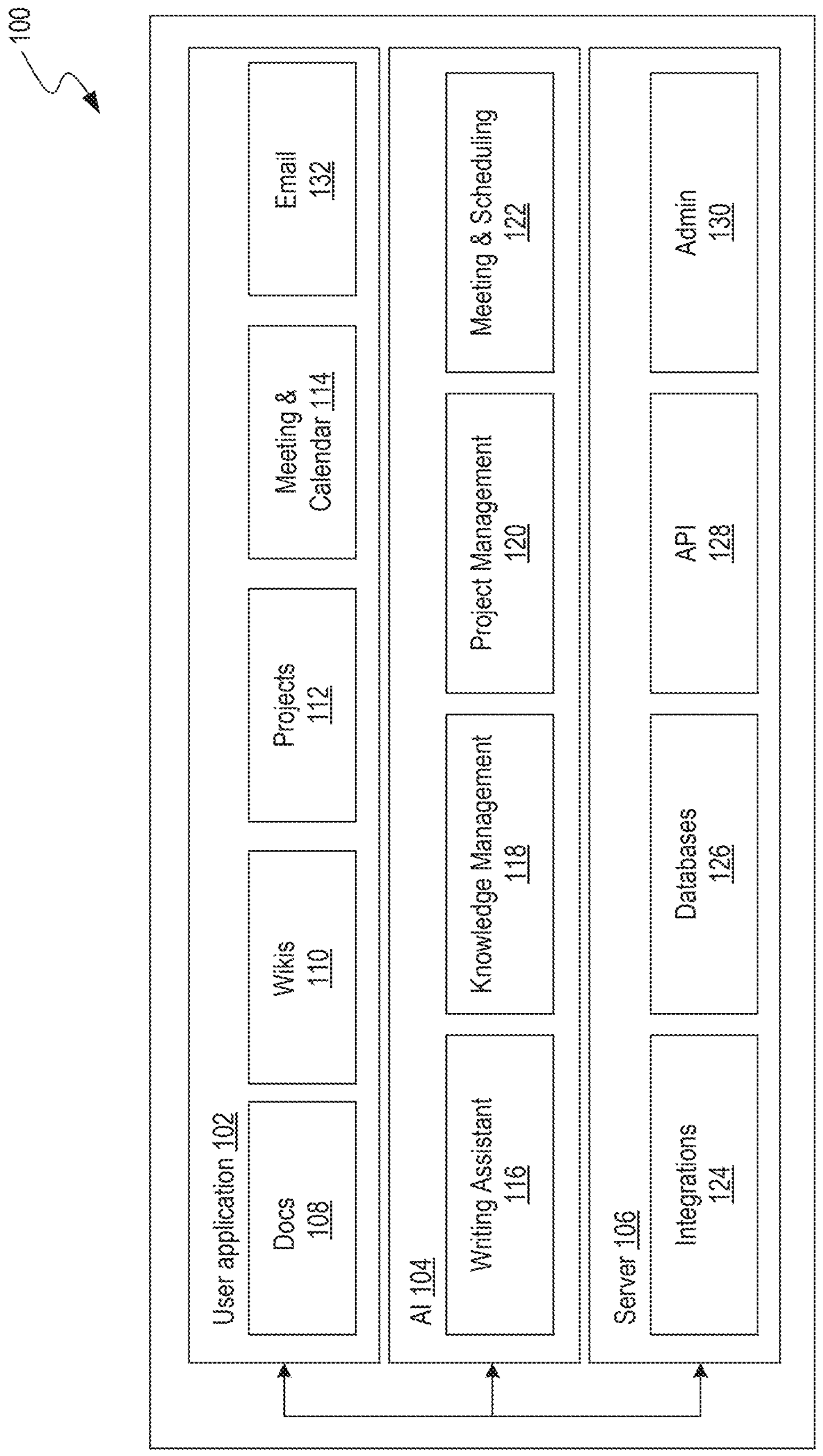
FIG. 1 is a block diagram illustrating a platform, which may be used to implement examples of the present disclosure.

The technologies described herein will become more apparent to those skilled in the art by studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Existing AI agents struggle to process and manage complex tasks, especially those involving coordination across multiple pages, databases, workspaces, or modules of an application. Furthermore, existing AI agents are often specialized and configured to complete simple, singular tasks with clearly defined execution instructions. The functionality of AI agents is typically constrained to narrowly defined operations, which significantly limits the applicability of the AI agents in real-world scenarios demanding layered reasoning and adaptability. AI agents configured to perform a broader set of operations, meanwhile, are often not constrained enough. These agents lack specific heuristics to follow or tools to execute while performing these operations, resulting in unwanted or inaccurate responses to user inputs and/or inefficient use of computational resources. As a result, existing AI agents may struggle to efficiently respond to user prompts requesting the AI agents to complete anything from repetitive tasks to complex data entry and editing of pages, databases, and workspaces.

The present technology provides for systems, methods, and computer-readable media for generating a response to a prompt from a user using an AI agent in a workspace application. In some embodiments, the AI agent generates a plan to complete a set of instructions to generate the response to the prompt. In these and other embodiments, the AI agent executes instructions by executing one or more tools that perform specific functions within an application and/or by following an integration assigning access permissions and a set of tools to the AI agent. Furthermore, the AI agent may be modified to modify particular rows in a database, to execute instructions in response to an occurrence of a trigger, and/or to replace itself with a deterministic script as the target that is activated by the trigger.

The present technology overcomes the above limitations of existing AI agents by providing an AI agent with planning capabilities to generate a plan for executing a set of instructions to complete various user tasks within a workspace application. The AI agent may access a set of tools, wherein each tool from the set of tools, when executed, performs a particular function within the workspace application. For example, each tool may include a code segment or other executable computer instruction that causes the function to be performed when executed. In some embodiments, each tool from the set of tools is associated with a description of the particular function performed when the tool is executed. The present technology provides the AI agent with the capability to compare the prompt to the description associated with each tool in the set of tools to create a plan for executing the set of instructions. Using the present technology, the AI agent may iterate over any number of tools deemed useful to execute the set of instructions, thereby enabling the AI agent to automatically refine the plan until a complete response to the prompt may be generated.

In some embodiments, the AI agent may activate an integration as part of executing the set of instructions to complete the plan. An integration is a heuristic or other rule that, when designated to/associated with an AI agent, governs the actions that may be taken by the AI agent. An integration may include a set of tools and/or a set of access permissions for the AI agent to follow to execute the set of instructions. The integration thereby defines the scope of the actions that may be performed by the AI agent, helping to prevent the AI agent from performing undesirable actions and/or expending excess computational resources. In some embodiments, the AI agent may determine that the integration is insufficient to execute the set of instructions. In such embodiments, the AI agent may update the associated integration by updating the set of access permissions and/or the set of tools and may cause display of a second indicator signaling that the integration has been updated. Once updated, the AI agent may attempt to re-execute the set of instructions using the updated integration (e.g., after a user approves the update). Thus, the AI agent may adapt to a set of instructions the AI agent is to perform, helping to prevent the integrations from becoming overly restrictive.

In some embodiments, an AI agent is added to a row within an agent column of a database and/or may be constrained to modifying particular entries in the database that are included in the row. In such embodiments, the AI agent may be configured to have a set of instructions including a particular modification to the database as a trigger and one or more actions to perform within the row of the database in response to the trigger. This configuration enables the AI agent to automatically react to changes in the row and/or to perform the one or more actions efficiently, as the AI agent is constrained to modifying entries in the row.

In some embodiments, a user configures specific automation parameters for an automation for a first AI agent via an AI agent automation configuration interface. An automation includes a trigger that automatically initiates a call of an AI agent, in turn causing the AI agent to execute a set of instructions associated with the AI agent. A trigger is an event (e.g., a text message, a thread creation, an emoji reaction, a user or AI agent mention, and/or a support ticket) that, upon occurrence, automatically initiates a call of a first AI agent within the workspace application. Automations therefore enable the AI agent to be called automatically under specific conditions that occur either within a workspace application including the AI agent or a third-party application.

In some embodiments, an occurrence of a trigger within a workspace application causes a script to replace the AI agent as a target of the trigger. In such embodiments, the AI agent may generate a computational resources determination in response to being called, the computational resources determination being a determination that the set of instructions the AI agent is configured to execute is appropriate for deterministic execution. This determination may be based on a prediction, by the AI agent, that deterministically executing the set of instructions uses fewer computational resources than executing the set of instructions using the AI agent. In response to such a determination, the user may approve replacing the AI agent with the script as a target of the trigger, resulting in the script, rather than the agent, being called upon the next occurrence of the trigger. Thus, computational efficiency may be improved by executing the script, which runs in a more predictable and less computationally intensive manner than the AI agent, instead of the AI agent.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Block Data Model

The disclosed technology includes a block data model ("block model"). The blocks are dynamic units of information that can be transformed into other block types and move across workspaces. The block model allows users to customize how their information is moved, organized, and shared. Hence, blocks contain information but are not siloed.

Blocks are singular pieces that represent all units of information inside an editor. In one example, text, images, lists, a row in a database, etc., are all blocks in a workspace. The attributes of a block determine how that information is rendered and organized. Every block can have attributes including an identifier (ID), properties, and type. Each block is uniquely identifiable by its ID. The properties can include a data structure containing custom attributes about a specific block. An example of a property is "title," which stores text content of block types such as paragraphs, lists, and the title of a page. More elaborate block types require additional or different properties, such as a page block in a database with user-defined properties. Every block can have a type, which defines how a block is displayed and how the block's properties are interpreted.

A block has attributes that define its relationship with other blocks. For example, the attribute "content" is an array (or ordered set) of block IDs representing the content inside a block, such as nested bullet items in a bulleted list or the text inside a toggle. The attribute "parent" is the block ID of a block's parent, which can be used for permissions. Blocks can be combined with other blocks to track progress and hold all project information in one place.

A block type is what specifies how the block is rendered in a user interface (UI), and the block's properties and content are interpreted differently depending on that type. Changing the type of a block does not change the block's properties or content—it only changes the type attribute. The information is thus rendered differently or even ignored if the property is not used by that block type. Decoupling property storage from block type allows for efficient transformation and changes to rendering logic and is useful for collaboration.

Blocks can be nested inside of other blocks (e.g., infinitely nested sub-pages inside of pages). The content attribute of a block stores the array of block IDs (or pointers) referencing those nested blocks. Each block defines the position and order in which its content blocks are rendered. This hierarchical relationship between blocks and their render children are referred to herein as a "render tree." In one example, page blocks display their content in a new page, instead of rendering it indented in the current page. To see this content, a user would need to click into the new page.

In the block model, indentation is structural (e.g., reflects the structure of the render tree). In other words, when a user indents something, the user is manipulating relationships between blocks and their content, not just adding a style. For example, pressing Indent in a content block can add that block to the content of the nearest sibling block in the content tree.

Blocks can inherit permissions of blocks in which they are located (which are above them in the tree). Consider a page: to read its contents, a user must be able to read the blocks within that page. However, there are two reasons one cannot use the content array to build the permissions system. First, blocks are allowed to be referenced by multiple content arrays to simplify collaboration and a concurrency model. But because a block can be referenced in multiple places, it is ambiguous which block it would inherit permissions from. The second reason is mechanical. To implement permission checks for a block, one needs to look up the tree, getting that block's ancestors all the way up to the root of the tree (which is the workspace). Trying to find this ancestor path by searching through all blocks' content arrays is inefficient, especially on the client. Instead, the model uses an "upward pointer"—the parent attribute—for the permission system. The upward parent pointers and the downward content pointers mirror each other.

A block's life starts on the client. When a user takes an action in the interface—typing in the editor, dragging blocks around a page—these changes are expressed as operations that create or update a single record. The "records" refer to persisted data, such as blocks, users, workspaces, etc. Because many actions usually change more than one record, operations are batched into transactions that are committed (or rejected) by the server as a group.

Creating and updating blocks can be performed by, for example, pressing Enter on a keyboard. First, the client defines all the initial attributes of the block, generating a new unique ID, setting the appropriate block type (to_do), and filling in the block's properties (an empty title, and checked: [["No"]]). The client builds operations to represent the creation of a new block with those attributes. New blocks are not created in isolation: blocks are also added to their parent's content array, so they are in the correct position in the content tree. As such, the client also generates an operation to do so. All these individual change operations are grouped into a transaction. Then, the client applies the operations in the transaction to its local state. New block objects are created in memory and existing blocks are modified. In native apps, the model caches all records that are accessed locally in an LRU (least recently used) cache on top of SQLite or IndexedDB, referred to as RecordCache. When records are changed on a native app, the model also updates the local copies in RecordCache. The editor re-renders to draw the newly created block onto the display. At the same time, the transaction is saved into TransactionQueue, the part of the client responsible for sending all transactions to the model's servers so that the data is persisted and shared with collaborators. TransactionQueue stores transactions safely in IndexedDB or SQLite (depending on the platform) until they are persisted by the server or rejected.

A block can be saved on a server to be shared with others. Usually, TransactionQueue sits empty, so the transaction to create the block is sent to the server in an application programming interface (API) request. In one example, the transaction data is serialized to JSON and posted to the/saveTransactions API endpoint. SaveTransactions gets the data into source-of-truth databases, which store all block data as well as other kinds of persisted records. Once the request reaches the API server, all the blocks and parents involved in the transaction are loaded. This gives a "before" picture in memory. The block model duplicates the "before" data that had just been loaded in memory. Next, the block model applies the operations in the transaction to the new copy to create the "after" data. Then the model uses both "before" and "after" data to validate the changes for permissions and data coherency. If everything checks out, all created or changed records are committed to the database—meaning the block has now officially been created. At this point, a "success" HTTP response to the original API request is sent by the client. This confirms that the client knows the transaction was saved successfully and that it can move on to saving the next transaction in the TransactionQueue. In the background, the block model schedules additional work depending on the kind of change made for the transaction. For example, the block model can schedule version history snapshots and indexing block text for a Quick Find function. The block model also notifies MessageStore, which is a real-time updates service, about the changes that were made.

The block model provides real-time updates to, for example, almost instantaneously show new blocks to members of a teamspace. Every client can have a long-lived WebSocket connection to the MessageStore. When the client renders a block (or page, or any other kind of record), the client subscribes to changes of that record from MessageStore using the WebSocket connection. When a team member opens the same page, the member is subscribed to changes of all those blocks. After changes have been made through the saveTransactions process, the API notifies MessageStore of new recorded versions. MessageStore finds client connections subscribed to those changing records and passes on the new version through their WebSocket connection. When a team member's client receives version update notifications from MessageStore, it verifies that version of the block in its local cache. Because the versions from the notification and the local block are different, the client sends a syncRecordValues API request to the server with the list of outdated client records. The server responds with the new record data. The client uses this response data to update the local cache with the new version of the records, then re-renders the user interface to display the latest block data.

Blocks can be shared instantaneously with collaborators. In one example, a page is loaded using only local data. On the web, block data is pulled from being in memory. On native apps, loading blocks that are not in memory are loaded from the RecordCache persisted storage. However, if missing block data is needed, the data is requested from an API. The API method for loading the data for a page is referred to herein as loadPageChunk; it descends from a starting point (likely the block ID of a page block) down the content tree and returns the blocks in the content tree plus any dependent records needed to properly render those blocks. Several layers of caching for loadPageChunk are used, but in the worst case, this API might need to make multiple trips to the database as it recursively crawls down the tree to find blocks and their record dependencies. All data loaded by loadPageChunk is put into memory (and saved in the RecordCache if using the app). Once the data is in memory, the page is laid out and rendered using React.

Software Platform

FIG. 1 is a block diagram of an example platform 100. The platform 100 provides users with an all-in-one workspace for data and project management. The platform 100 can include a user application 102, an artificial intelligence (AI) tool 104, and a server 106. The user application 102, the AI tool 104, and the server 106 are in communication with each other via a network.

In some implementations, the user application 102 is a cross-platform software application configured to work on several computing platforms and web browsers. The user application 102 can include a variety of templates. A template refers to a prebuilt page that a user can add to a workspace within the user application 102. The templates can be directed to a variety of functions. Exemplary templates include a docs template 108, a wikis template 110, a projects template 112, a meeting and calendar template 114, and an email template 132. In some implementations, a user can generate, save, and share customized templates with other users.

The user application 102 templates can be based on content "blocks." For example, the templates of the user application 102 include a predefined and/or pre-organized set of blocks that can be customized by the user. Blocks are content containers within a template that can include text, images, objects, tables, maps, emails, and/or other pages (e.g., nested pages or sub-pages). Blocks can be assigned to certain properties. The blocks are defined by boundaries having dimensions. The boundaries can be visible or non-visible for users. For example, a block can be assigned as a text block (e.g., a block including text content), a heading block (e.g., a block including a heading), or a sub-heading block having a specific location and style to assist in organizing a page. A block can be assigned as a list block to include content in a list format. A block can be assigned as an AI prompt block (also referred to as a "prompt block") that enables a user to provide instructions (e.g., prompts) to the AI tool 104 to perform functions. A block can also be assigned to include audio, video, or image content.

A user can add, edit, and remove content from the blocks. The user can also organize the content within a page by moving the blocks around. In some implementations, the blocks are shared (e.g., by copying and pasting) between the different templates within a workspace. For example, a block embedded within multiple templates can be configured to show edits synchronously.

The docs template 108 is a document generation and organization tool that can be used for generating a variety of documents. For example, the docs template 108 can be used to generate pages that are easy to organize, navigate, and format. The wikis template 110 is a knowledge management application having features similar to the pages generated by the docs template 108 but that can additionally be used as a database. The wikis template 110 can include, for example, tags configured to categorize pages by topic and/or include an indication of whether the provided information is verified to indicate its accuracy and reliability. The projects template 112 is a project management and note-taking software tool. The projects template 112 can allow the users, either as individuals or as teams, to plan, manage, and execute projects in a single forum. The meeting and calendar template 114 is a tool for managing tasks and timelines. In addition to traditional calendar features, the meeting and calendar template 114 can include blocks for categorizing and prioritizing scheduled tasks, generating to-do and action item lists, tracking productivity, etc. The various templates of the user application 102 can be included under a single workspace and include synchronized blocks. For example, a user can update a project deadline on the projects template 112, which can be automatically synchronized to the meeting and calendar template 114. The various templates of the user application 102 can be shared within a team, allowing multiple users to modify and update the workspace concurrently.

The email template 132 allows the users to customize their inbox by representing the inbox as a customizable database where the user can add custom columns and create custom views with layouts. One view can include multiple layouts including a calendar layout, a summary layout, and an urgent information layout. Each view can include a customized structure including custom criteria, custom properties, and custom actions. The custom properties can be specific to a view such as AI-extracted properties and/or heuristic-based properties. The custom actions can trigger automatically when a message enters the view. The custom actions can include deterministic rules like "Archive this," or assistant workflows like responding to support messages by searching user applications 102 or filing support tickets. In addition, the view can include actions, such as buttons, that are custom to the view and perform operations on the messages in the inbox. Only the customized structure can be shared with other users of the system, or both the customized structure and the messages can be shared.

The integration of the docs template 108, the wikis template 110, the projects template 112, the meeting and calendar template 114, and the email template 132 enables linking and embedding of templates within other templates. For example, an email sent from an email address within the platform 100 to another email address within the platform 100 can include an embedding of a document within the platform 100, or an embedding of a block within the document. In another example, a wiki can link to a meeting within the calendar.

The AI tool 104 is an integrated AI assistant that enables AI-based functions for the user application 102. In one example, the AI tool 104 is based on a neural network architecture, such as the transformer 212 described in relation to FIG. 2. The AI tool 104 can interact with blocks embedded within the templates on a workspace of the user application 102. For example, the AI tool 104 can include a writing assistant tool 116, a knowledge management tool 118, a project management tool 120, and a meeting and scheduling tool 122. The different tools of the AI tool 104 can be interconnected and interact with different blocks and templates of the user application 102.

The writing assistant tool 116 can operate as a generative AI tool for creating content for the blocks in accordance with instructions received from a user. Creating the content can include, for example, summarizing, generating new text, or brainstorming ideas. For example, in response to a prompt received as a user input that instructs the AI to describe what the climate is like in New York, the writing assistant tool 116 can generate a block including text that describes the climate in New York. As another example, in response to a prompt that requests ideas on how to name a pet, the writing assistant tool 116 can generate a block including a list of creative pet names. The writing assistant tool 116 can also operate to modify existing text. For example, the writing assistant can shorten, lengthen, or translate existing text, correct grammar and typographical errors, or modify the style of the text (e.g., a social media style versus a formal style).

The knowledge management tool 118 can use AI to categorize, organize, and share knowledge included in the workspace. In some implementations, the knowledge management tool 118 can operate as a question-and-answer assistant. For example, a user can provide instructions on a prompt block to ask a question. In response to receiving the question, the knowledge management tool 118 can provide an answer to the question, for example, based on information included in the wikis template 110. The project management tool 120 can provide AI support for the projects template 112. The AI support can include autofilling information based on changes within the workspace or automatically tracking project development. For example, the project management tool 120 can use AI for task automation, data analysis, real-time monitoring of project development, allocation of resources, and/or risk mitigation. The meeting and scheduling tool 122 can use AI to organize meeting notes, unify meeting records, list key information from meeting minutes, and/or connect meeting notes with deliverable deadlines.

The server 106 can include various units (e.g., including compute and storage units) that enable the operations of the AI tool 104 and workspaces of the user application 102. The server 106 can include an integrations unit 124, an application programming interface (API) 128, databases 126, and an administration (admin) unit 130. The databases 126 are configured to store data associated with the blocks. The data associated with the blocks can include information about the content included in the blocks, the function associated with the blocks, and/or any other information related to the blocks. The API 128 can be configured to communicate the block data between the user application 102, the AI tool 104, and the databases 126. The API 128 can also be configured to communicate with remote server systems, such as AI systems. For example, when a user performs a transaction within a block of a template of the user application 102 (e.g., in a docs template 108), the API 128 processes the transaction and saves the changes associated with the transaction to the database 126. The integrations unit 124 is a tool connecting the platform 100 with external systems and software platforms. Such external systems and platforms can include other databases (e.g., cloud storage spaces), messaging software applications, or audio or video conference applications. The administration unit 130 is configured to manage and maintain the operations and tasks of the server 106. For example, the administration unit 130 can manage user accounts, data storage, security, performance monitoring, etc.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others. Unlike discriminative models, generative models are distinguished by their ability to create new, synthetic data that closely resembles the training data. In contrast, discriminative models focus on predicting labels for given inputs.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from online webpages and/or publicly available social media posts. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data can be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses large language models (LLMs).

A language model can use a neural network (typically a DNN) to perform natural language processing (NLP) tasks. A language model can be trained to model how words relate to each other in a textual sequence, based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as RNN-based language models.

Figure 2:
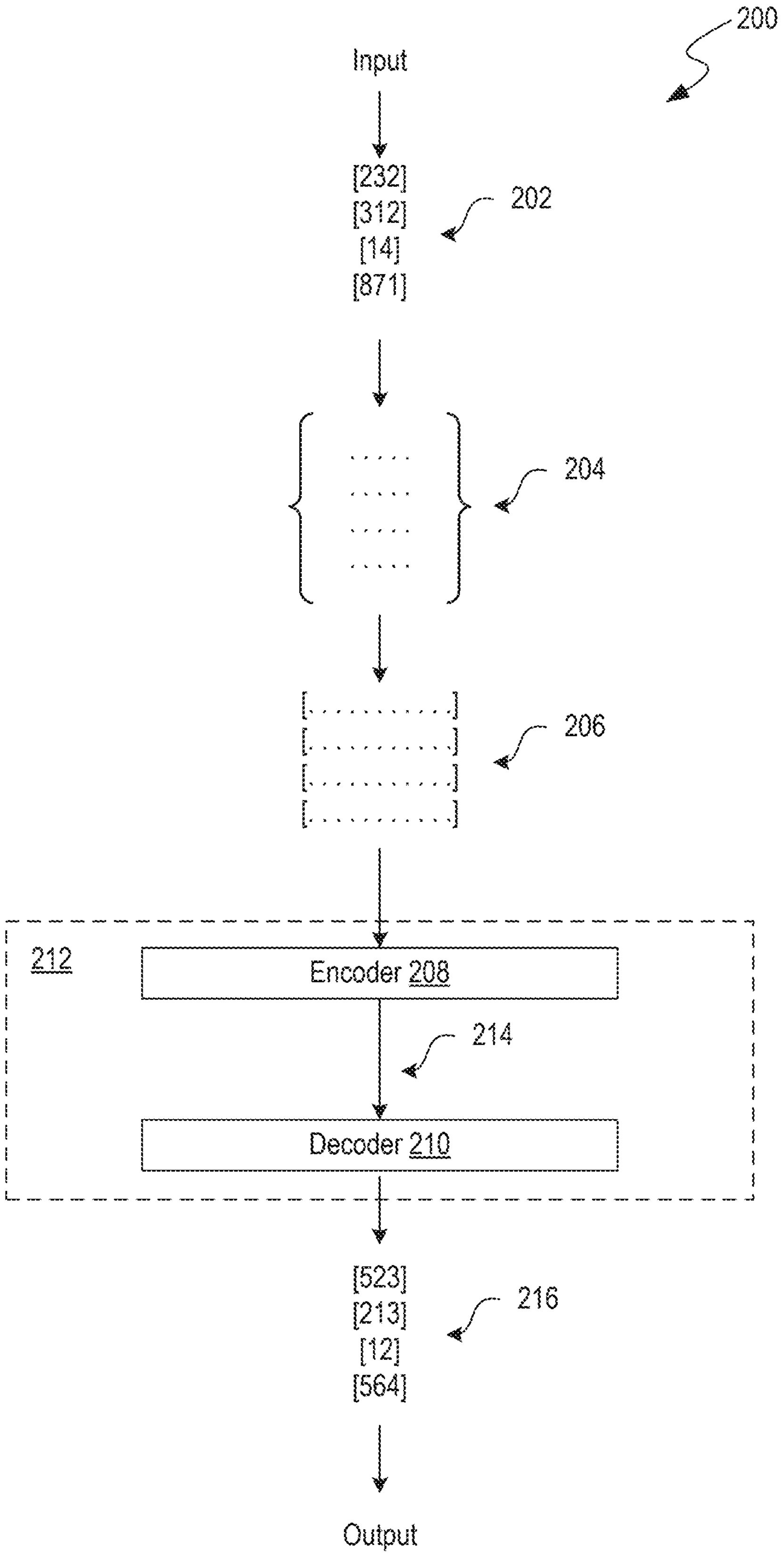
FIG. 2 is a block diagram of a transformer neural network, which may be used in examples of the present disclosure.

FIG. 2 is a block diagram 200 of an example transformer 212. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as RNN-based language models.

The transformer 212 includes an encoder 208 (which can include one or more encoder layers/blocks connected in series) and a decoder 210 (which can include one or more decoder layers/blocks connected in series). Generally, the encoder 208 and the decoder 210 each include multiple neural network layers, at least one of which can be a self-attention layer. The parameters of the neural network layers can be referred to as the parameters of the language model.

The transformer 212 can be trained to perform certain functions on a natural language input. Examples of the functions include summarizing existing content, brainstorming ideas, writing a rough draft, fixing spelling and grammar, and translating content. Summarizing can include extracting key points or themes from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 212 is trained to perform certain functions on other input formats than natural language input. For example, the input can include objects, images, audio content, or video content, or a combination thereof.

The transformer 212 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 2 illustrates an example of how the transformer 212 can process textual input data. Input to a language model (whether transformer-based or otherwise) typically is in the form of natural language that can be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 2, a short sequence of tokens 202 corresponding to the input text is illustrated as input to the transformer 212. Tokenization of the text sequence into the tokens 202 can be performed by some pre-processing tokenization module such as, for example, a byte-pair encoding tokenizer (the "pre" referring to the tokenization occurring prior to the processing of the tokenized input by the LLM), which is not shown in FIG. 2 for brevity. In general, the token sequence that is inputted to the transformer 212 can be of any length up to a maximum length defined based on the dimensions of the transformer 212. Each token 202 in the token sequence is converted into an embedding vector 206 (also referred to as "embedding 206").

An embedding 206 is a learned numerical representation (such as, for example, a vector) of a token that captures some semantic meaning of the text segment represented by the token 202. The embedding 206 represents the text segment corresponding to the token 202 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 206 corresponding to the "write" token will be closer to another embedding corresponding to the "jot down" token in the vector space as compared to the distance between the embedding 206 corresponding to the "write" token and another embedding corresponding to the "summary" token.

The vector space can be defined by the dimensions and values of the embedding vectors. Various techniques can be used to convert a token 202 to an embedding 206. For example, another trained ML model can be used to convert the token 202 into an embedding 206. In particular, another trained ML model can be used to convert the token 202 into an embedding 206 in a way that encodes additional information into the embedding 206 (e.g., a trained ML model can encode positional information about the position of the token 202 in the text sequence into the embedding 206). In some implementations, the numerical value of the token 202 can be used to look up the corresponding embedding in an embedding matrix 204, which can be learned during training of the transformer 212.

The generated embeddings 206 are input into the encoder 208. The encoder 208 serves to encode the embeddings 206 into feature vectors 214 that represent the latent features of the embeddings 206. The encoder 208 can encode positional information (i.e., information about the sequence of the input) in the feature vectors 214. The feature vectors 214 can have very high dimensionality (e.g., on the order of thousands or tens of thousands), with each element in a feature vector 214 corresponding to a respective feature. The numerical weight of each element in a feature vector 214 represents the importance of the corresponding feature. The space of all possible feature vectors 214 that can be generated by the encoder 208 can be referred to as a latent space or feature space.

Conceptually, the decoder 210 is designed to map the features represented by the feature vectors 214 into meaningful output, which can depend on the task that was assigned to the transformer 212. For example, if the transformer 212 is used for a translation task, the decoder 210 can map the feature vectors 214 into text output in a target language different from the language of the original tokens 202. Generally, in a generative language model, the decoder 210 serves to decode the feature vectors 214 into a sequence of tokens. The decoder 210 can generate output tokens 216 one by one. Each output token 216 can be fed back as input to the decoder 210 in order to generate the next output token 216. By feeding back the generated output and applying self-attention, the decoder 210 can generate a sequence of output tokens 216 that has sequential meaning (e.g., the resulting output text sequence is understandable as a sentence and obeys grammatical rules). The decoder 210 can generate output tokens 216 until a special [EOT] token (indicating the end of the text) is generated. The resulting sequence of output tokens 216 can then be converted to a text sequence in post-processing. For example, each output token 216 can be an integer number that corresponds to a vocabulary index. By looking up the text segment using the vocabulary index, the text segment corresponding to each output token 216 can be retrieved, the text segments can be concatenated together, and the final output text sequence can be obtained.

In some implementations, the input provided to the transformer 212 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to the question, text associated with the request, or a list of ideas associated with the request. For example, the input can include the question "What is the weather like in San Francisco?" and the output can include a description of the weather in San Francisco. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via an API (e.g., the API 128 in FIG. 1). As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Hierarchical Organizational Blocks in a Workspace

Figure 3:
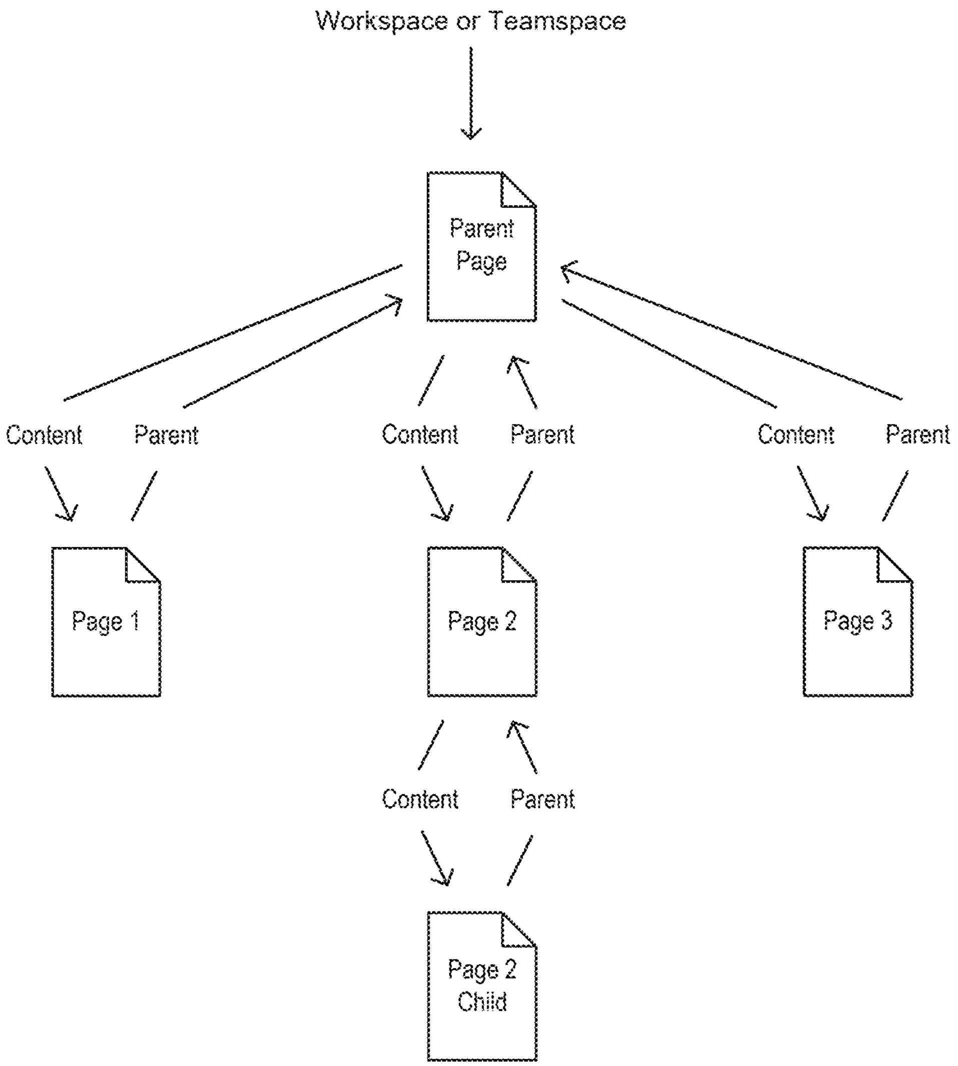
FIG. 3 is a block diagram illustrating a hierarchical organization of pages in a workspace.

FIG. 3 is a block diagram illustrating a hierarchical organization of pages in a workspace. As described with respect to the block data model of the present technology, a workspace can include multiple pages (e.g., page blocks). The pages (e.g., including parent pages and child or nested pages) can be arranged hierarchically within the workspace or one or more teamspaces, as shown in FIG. 3. The page can include a block such as tabs, lists, images, tables, etc. Although depicted as including pages in FIG. 3, a similar hierarchical organization may be used for other data objects as well (e.g., databases).

A teamspace can refer to a collaborative space associated with a team or an organization that is hierarchically below a workspace. For example, a workspace can include a teamspace accessible by all users of an organization and multiple teamspaces that are accessible by users of different teams. Accessibility generally refers to creating, editing, and/or viewing content (e.g., pages) included in the workspace or the one or more teamspaces.

In the hierarchical organization illustrated in FIG. 3, a parent page (e.g., "Parent Page") is located hierarchically below the workspace or a teamspace. The parent page includes three children pages (e.g., "Page 1," "Page 2," and "Page 3"). Each of the child pages can further include subpages (e.g., "Page 2 Child," which is a grandchild of "Parent Page" and child of "Page 2"). The "Content" arrows in FIG. 3 indicate the relationship between the parents and children while the "Parent" arrows indicate the inheritance of access permissions. The child pages inherit access permission from the (immediate) parent page under which they are located hierarchically (e.g., which is above them in the tree). For example, "Page 2" inherited the access permission of the "Parent Page" as a default when it was created under its parent page. Similarly, "Page 2 Child" inherited the access permission of the parent page as a default when it was created under its parent page. "Parent Page," "Page 2," and "Page 2 Child" thereby have the same access permission within the workspace.

The relationships and organization of the content can be modified by changing the location of the pages. For example, when a child page is moved to be under a different parent, the child page's access permission modifies to correspond to the access permission of the new parent. Also, when the access permission of "Parent Page" is modified, the access permission of "Page 1," "Page 2," and "Page 3" can be automatically modified to correspond to the access permission of "Parent Page" based on the inheritance character of access permissions.

In contrast, however, a user can modify the access permission of the children independently of their parents. For example, the user can modify the access permission of "Page 2 Child" in FIG. 3 so that it is different from the access permission of "Page 2" and "Parent Page." The access permission of "Page 2 Child" can be modified to be broader or narrower than the access permission of its parents. As an example, "Page 2 Child" can be shared on the internet while "Page 2" is only shared internally to the users associated with the workspace. As another example, "Page 2 Child" can be shared only with an individual user while "Page 2" is shared with a group of users (e.g., a team of the organization associated with the workspace). In some implementations, the hierarchical inheritance of the access permissions described herein can be modified from the previous description. For example, the access permissions of all the pages (parent and children) can be defined as independently changeable.

Tools and AI Agents

Figure 4:
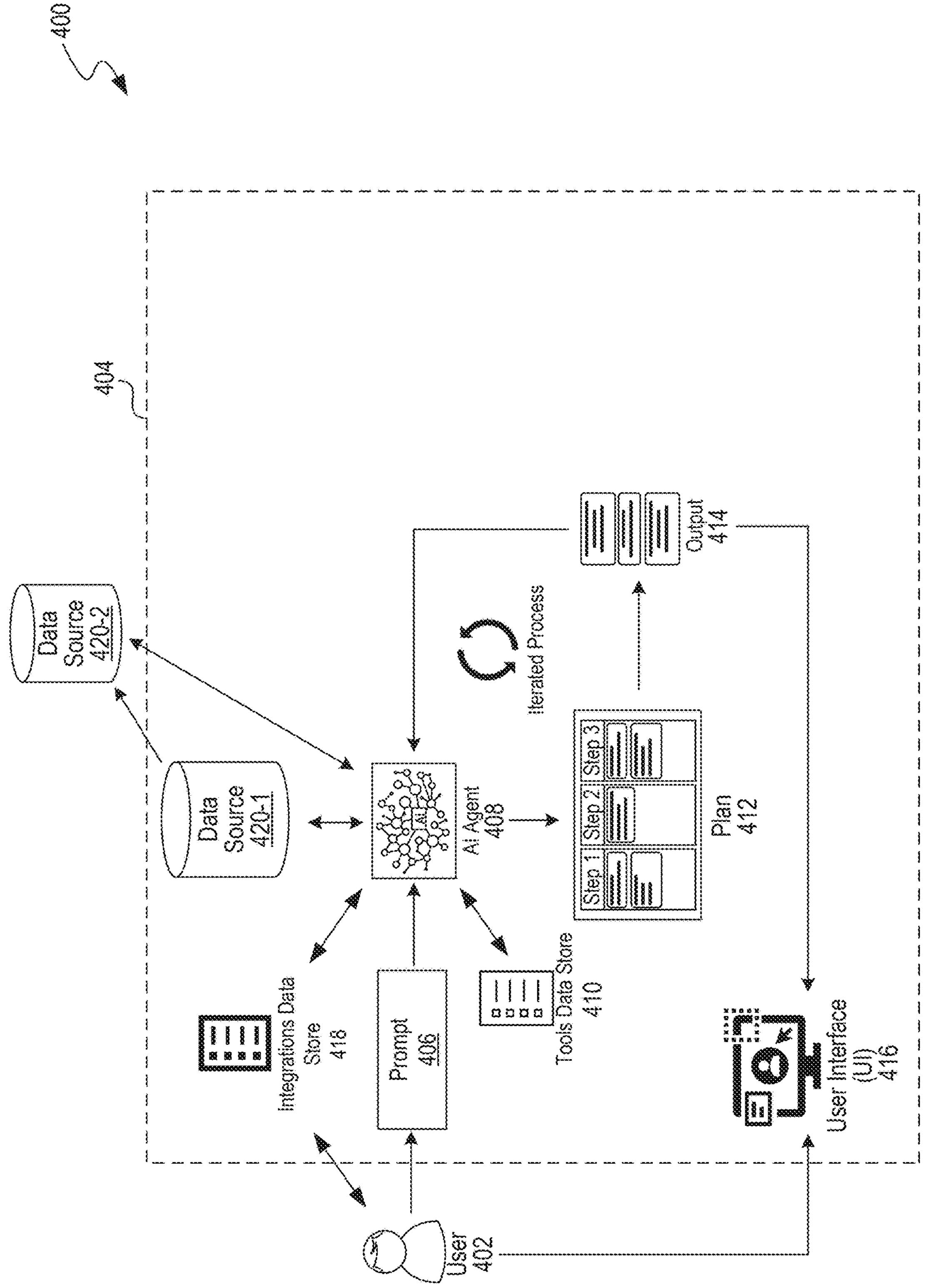
FIG. 4 illustrates an example workspace environment including an AI agent that generates responses to user prompts within a workspace application.

FIG. 4 illustrates an example workspace environment 400 including an AI agent 408 that generates responses to user prompts within a workspace application 404. As shown, the workspace environment 400 includes a user 402, a workspace application 404, a prompt 406, an AI agent 408, a tools data store 410, a plan 412, an output 414, a user interface (UI) 416, an integrations data store 418, and data sources 420-1 and 420-2. The workspace environment 400 may be implemented using components of the example computer system illustrated and described in more detail with reference to FIG. 25 below. Likewise, implementations of the example workspace environment 400 can include different and/or additional components or can be connected in different ways.

The user 402 is an individual or entity with access to the workspace application 404, which is an application or other software component providing a suite of tools for data and/or project management (e.g., Notion®). One of the ways in which the user 402 may interact with the workspace application 404 is by inputting a prompt 406 to the workspace application 404. The prompt 406 is a natural language query, instruction, and/or other communication received from the user 402 via a text interface, audio interface, and/or another interface of the workspace application 404 that describes a task the user wishes to be performed within the workspace application 404.

As depicted in FIG. 4, once the prompt 406 is obtained by the workspace application 404, the prompt 406 is provided, as input, to an AI agent 408. The AI agent 408 is a software component that invokes an AI model or algorithm, applies the model to an input, and processes the output of the model to automatically perform functions of the workspace application 404. For example, the AI agent 408 may include one or more features of the AI tool 104 and/or the transformer 212 described in relation to FIGS. 1 and 2 above, respectively. Additionally or alternatively, the AI agent 408 may invoke a commercial AI model such as GPT-4 or Claude 3.7 Sonnet.

The AI agent 408 may process the prompt 406 using one or more tools from a tools data store 410. The tools data store 410 is a combination of hardware and/or software that stores a set of tools (e.g., in a page, a database, or another block) within the workspace application 404. In some embodiments, each tool from the set of tools, when executed, performs a particular function within the workspace application 404. For example, each tool can include a code segment or other executable computer instruction that causes the function to be performed when executed. In these and other embodiments, each tool from the set of tools is associated with a description of the particular function performed when the tool is executed. For example, the description may be a natural language text description of the function of a tool included in data serialization language file (e.g., a JSON, YAML, or XML file) associated with the tool. The tools data store 410 may include any of the tools described in relation to FIG. 1 above. Additionally or alternatively, the tools data store 410 may include tools for modifying a page (e.g., a page creation tool, a page update tool, a page deletion tool), modifying a database (e.g., a database creation tool, a database update tool, a database deletion tool), and/or for retrieving data from a database (e.g., a database query tool).

As depicted in FIG. 4, the AI agent 408 processes the prompt 406 in an iterative process using one or more tools from the tools data store 410. For example, the AI agent 408 may first determine a semantic meaning of the prompt 406

(e.g., using a language model as described above) and then compare the semantic meaning to one or more descriptions associated with tools in the tools data store 410. This comparison enables the AI agent 408 to determine the function of each tool and evaluate that function's relevance to responding to the prompt 406. Continuing with the same example, the AI agent 408 may then, based on the comparison, determine a list of usable tools from within the tools data store 410 for responding to the prompt 406. The list of usable tools may represent some or all of the tools that the AI agent 408 deems relevant to responding to the prompt 406 based on similarities/associations between the semantic meaning of the prompt 406 and the descriptions of those tools.

In some embodiments, the AI agent 408 generates, based on a list of usable tools and a semantic meaning of the prompt 406, a plan 412. The plan 412 represents a series of steps to be performed (e.g., by the AI agent 408 and/or one or more other AI agents) to respond to the prompt and may include one or more instructions for executing one or more of the tools from the list of usable tools in a predetermined order. Specifying an order for executing the one or more tools may improve the reliability of responses, as certain tools may depend on the output of other tools to execute successfully and may therefore fail if not sequenced to execute after those other tools. Additionally or alternatively, the predetermined order may be chosen to increase a computational efficiency of executing the plan 412 (e.g., as some orders of executing the one or more tools may be more efficient than others) and/or to increase a clarity of the eventual response to the prompt (e.g., certain tools may provide certain information as output that serves as context for interpreting later tool outputs, enabling the outputs to eventually be combined/synthesized in a more coherent manner).

In some embodiments, the workspace application 404 determines that executing a particular instruction from the first plan would include performing a high-risk function. A high-risk function is an action within the workspace application 404 that is not easily reversible and/or which may result in the loss of data for the user 402. Because these high-risk functions may have notable and potentially negative consequences for a user 402, mechanisms for obtaining permission from the user 402 to perform these functions may be included in the workspace environment 400. For example, in response to determining that executing a particular instruction from the first plan would include performing a high-risk function, the workspace application may cause display (e.g., via the UI 416 and/or another UI) of a notification of performing the high-risk function. Continuing with the same example, the workspace application 404 may receive a confirmation from the user of performing the high-risk function (e.g., via the UI 416 and/or another UI) and only then execute the particular instruction corresponding to the high-risk function, thereby enabling the user 402 to acknowledge and accept the risk of performing this function in advance.

Once the plan 412 is generated and, in some embodiments, after user confirmation is received, the workspace application 404 executes one or more instructions from the plan 412 (e.g., using the AI agent 408 and/or one or more other AI agents), resulting in an output 414. In some embodiments, one or more instructions from the plan 412 are executed by designating an integration from an integrations data store 418 as a heuristic for the AI agent 408 to follow and directing the AI agent 408 to execute the one or more instructions consistently within the integration. The integrations data store 418 may be a combination of hardware and/or software that stores a set of integrations (e.g., in a page, a database, or another block) within the workspace application 404. Integrations are described in more detail in relation to FIG. 10 below.

As depicted in FIG. 4, in embodiments where the AI agent 408 executes one or more of the instructions, said execution may cause the AI agent 408 to extract information from one or more data sources 420. For example, the AI agent may access a first data source 420-1 that is a connected data source included in the workspace application 404 (e.g., as a page, database, or other block) and which includes data that is semantically similar and/or relevant to responding to the prompt 406 (e.g., as determined by a language model invoked by the AI agent 408). Continuing with the same example, the AI agent may access a second data source 420-2 that is a source of data from outside the workspace application 404, such as a third-party application (e.g., an application operated by an entity other than the operator of the workspace application 404), a web source (e.g., a website on the Internet), or a second AI agent that is generally similar to the AI agent 408 but is not hosted within the workspace application 404.

In some embodiments, the workspace application 404 directs the output 414 to be evaluated (e.g., by the AI agent 408 and/or one or more other AI agents) to determine whether the output 414 is a successful response to the prompt 406. For example, the determination may be based on a comparison between the semantic meaning of the prompt 406 and a semantic meaning of the output 414 and/or based on feedback from users of the workspace application 404 regarding the completeness of responses received to various prompts. A successful response is an output that, based on the determination, is predicted to be satisfactory to the user 402 and provides the user 402 with enough information to feel as if the prompt 406 has been fulfilled and/or addressed completely.

Different actions may then be performed based on whether the output 414 is determined to be a successful response to the prompt 406. In embodiments where the output 414 is indicated to be a successful response, the workspace application 404 causes the output 414 to be displayed via a U) 416, thereby allowing the user 402 to review the output 414 and/or provide follow-up prompts to the workspace application 404 where more information is required.

In embodiments where the output 414 is indicated not to be a successful response, the AI agent 408 may be directed to generate a second plan based on the semantic meaning of the prompt 406 and the output 414. The second plan may be generally similar to the plan 412 except that the second plan includes a different set of instructions meant to address the deficiencies of the output 414 in responding to the prompt 406 (e.g., the second plan may be a revision to the plan 412). This second plan may then be received by the workspace application 404 and one or more instructions from the second plan may be executed to generate a second output, which is then itself evaluated to determine whether the second output is a successful response to the prompt 406. This process of generating a plan, executing instructions from the plan, and evaluating the resulting output may be repeated any number of times until the resulting output is deemed a successful response, at which point display of the output is caused as described above. Thus, through this iterative process, the workspace application 404 may thoroughly address the prompt 406 and respond to the user 402 more effectively than traditional systems in which non-iterative response processes are used.

In some embodiments, the output 414 may be a partial response to the prompt 406. A partial response is an output generated based on execution of a subset of some, but not all, of the instructions in the plan 412 and that therefore is not a complete response to the prompt 406. In such embodiments, rather than being evaluated as a complete response to the prompt 406, the output 414 may be evaluated to determine whether the output 414 is a successful partial response to the prompt 406, meaning the output 414 represents a successful execution of the subset of instructions and provides sufficient information to result in a complete response to the prompt 406 once a remainder of the instructions in the plan 412 (e.g., the instructions included in the plan 412 that have not yet been executed) are executed. In embodiments where the output 414 is indicated to be a successful partial response, the remainder of the instructions may then be executed to generate a second output that is different from the output 414 and responds fully to the prompt 406. In other embodiments where the output 414 is indicated not to be a successful partial response, the AI agent 408 may be directed to generate a second plan and re-iterate the plan execution process as described above to address the deficiencies in the partial response.

Evaluating the output 414 as a partial response before all the instructions in the plan 412 have been generated improves the efficiency of the iterative plan execution process of the workspace application 404, as deficiencies/errors in the plan 412 may be detected before all the instructions in the plan 412 are executed, saving computational resources that would otherwise be spent on executing a plan that would ultimately not result in a usable output and enabling the workspace application 404 to iterate and therefore generate a complete response to the prompt 406 more quickly. Additionally, evaluating partial responses enables the workspace application to update the user on intermediate steps performed in the plan execution process by causing display (e.g., via the UI 416 or another UI) of a status update corresponding to these partial responses. For example, in embodiments where the output 414 is a partial response, a status update including the output 414 and/or additional information related to the generation of the output 414, the content of the output 414, progress in executing the instructions of the plan 412 reflected by the output 414, and/or other status-related information may be displayed to the user 402 (e.g., via the UI 416).

Example User Interfaces

Figure 5:
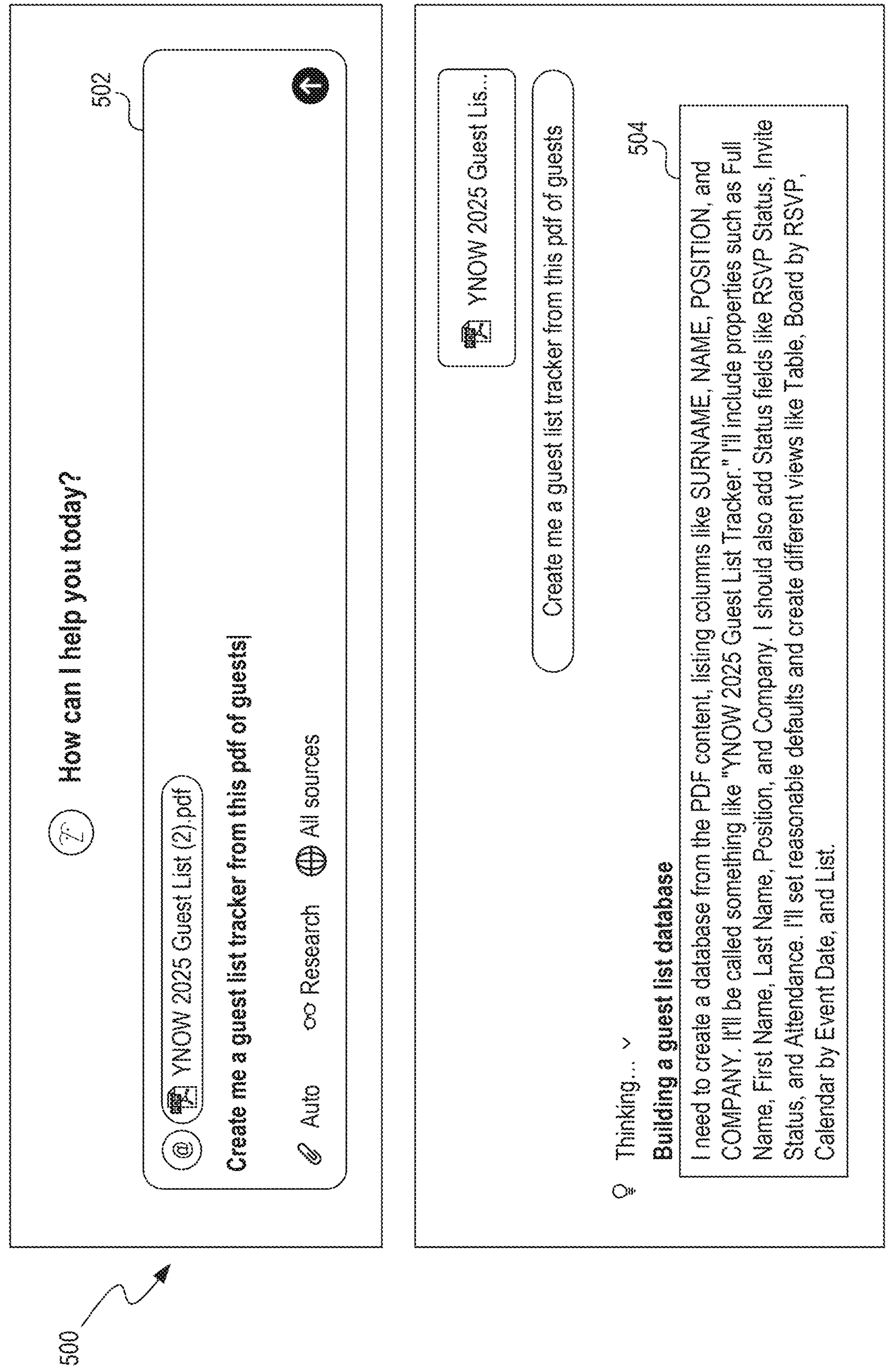
FIG. 5 illustrates an example homepage user interface (UI) that may be included in a workspace environment.

FIG. 5 illustrates an example homepage UI 500 that may be included in a workspace environment (e.g., the workspace environment 400). As shown, the homepage UI 500 includes an input field 502 in which a user (e.g., the user 402) can input (e.g., by typing or using speech-to-text) a prompt to be provided to an AI agent. The prompt and AI agent may be the same as or generally similar to the prompt 406 and AI agent 408 described in relation to FIG. 4 above.

The homepage UI 500 also includes a human-readable list of steps 504 describing a plan (e.g., which is the same as or generally similar to the plan 412 described in relation to FIG. 4 above) to be executed by the AI agent. The human-readable list of steps is natural language text that describes a set of instructions in the plan, thereby outlining for the user the process that will be performed in response to the prompt entered via the input field 502. For example, after the AI agent generates the plan, the AI agent and/or another AI agent may invoke a language model to generate natural language descriptions of one or more instructions in the plan and then describe the sequence of performing those instructions in natural language text that is included in the human-readable list of steps 504.

Figure 6:
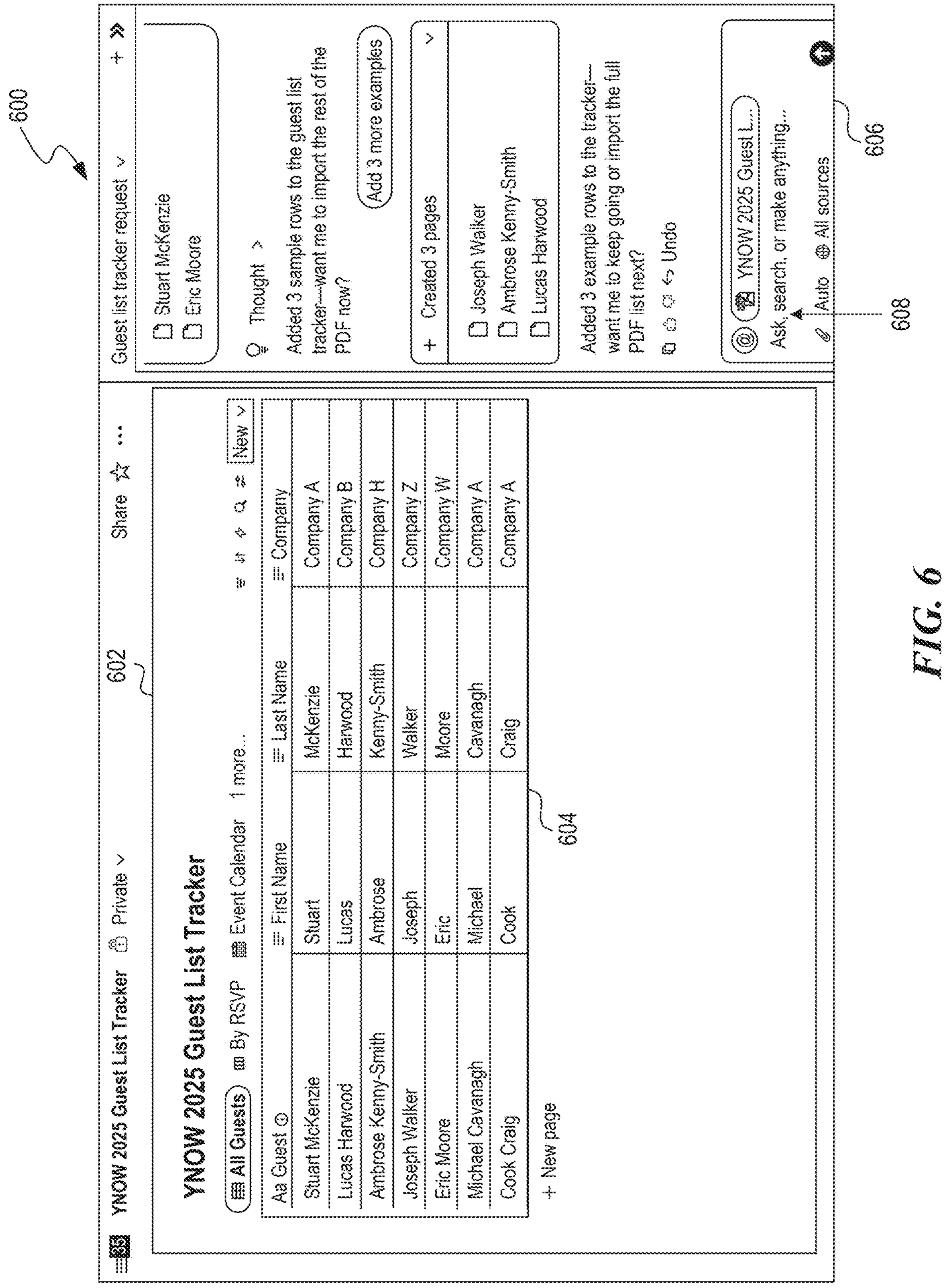
FIG. 6 is an example database UI that may be included in a workspace environment and may be edited by an AI agent using one or more tools.

FIG. 6 is an example database UI 600 that may be included in a workspace environment (e.g., the workspace environment 400) and may be edited by an AI agent using one or more tools. As shown, the database UI 600 includes a database 602 containing a plurality of pages 604. Each page in the plurality of pages 604 is a row of the database 602, which is displayed in the database UI 600 in a table format. A workspace application hosting the database 602 (e.g., the workspace application 404) may store the database 602 and/or the plurality of pages 604 as one or more blocks (as described above) and may convert a page from the plurality of pages 604 into a standardized page layout by formatting each entry in the corresponding row for the page as an element in the standardized page layout.

The database UI 600 also includes a communication interface 606 where a user may input prompts and receive responses to those prompts from the AI agent. The communication interface 606 includes an input field 608 that is generally similar to the input field 502 described in relation to FIG. 5 above via which the user may input one or more prompts. For example, as depicted in FIG. 6, the user inputted the prompt "Add 3 more examples." In response, the AI agent generated an output (e.g., as described in relation to FIG. 4 above) of three additional pages to include as examples in the database 602. The names of these example pages are displayed within the communication interface 606 as a status update to help the user track the activity of the AI agent in response to the prompts received via the communication interface 606. Accordingly, the AI agent may modify a page and/or a database within a workspace application in the course of executing the instructions of a plan and/or a status update corresponding to that modification may be displayed to the user.

In some embodiments, to enable the AI agent to modify the database 602 and/or a page therein, the database 602 and/or the page are converted into a markup language representation (e.g., a markdown file), which is a text-based encoding of the database 602 and/or the page specifying a structure for, a format of, and/or component relationships for the database 602 and/or the page. In such embodiments, the markup language representation may be provided to the AI agent while the AI agent executes one or more instructions for performing the modification and/or may edit the markup language representation to make those modifications. Enabling the AI agent to access and edit the markup language representation provides the AI agent with information in a standardized format that the AI agent may more easily recognize and accurately modify than providing the AI agent with alternative representations of the database 602 and/or the page, improving the accuracy and efficiency of the AI agent in responding to prompts requesting modifications.

Example Backend Processes

Figure 7:
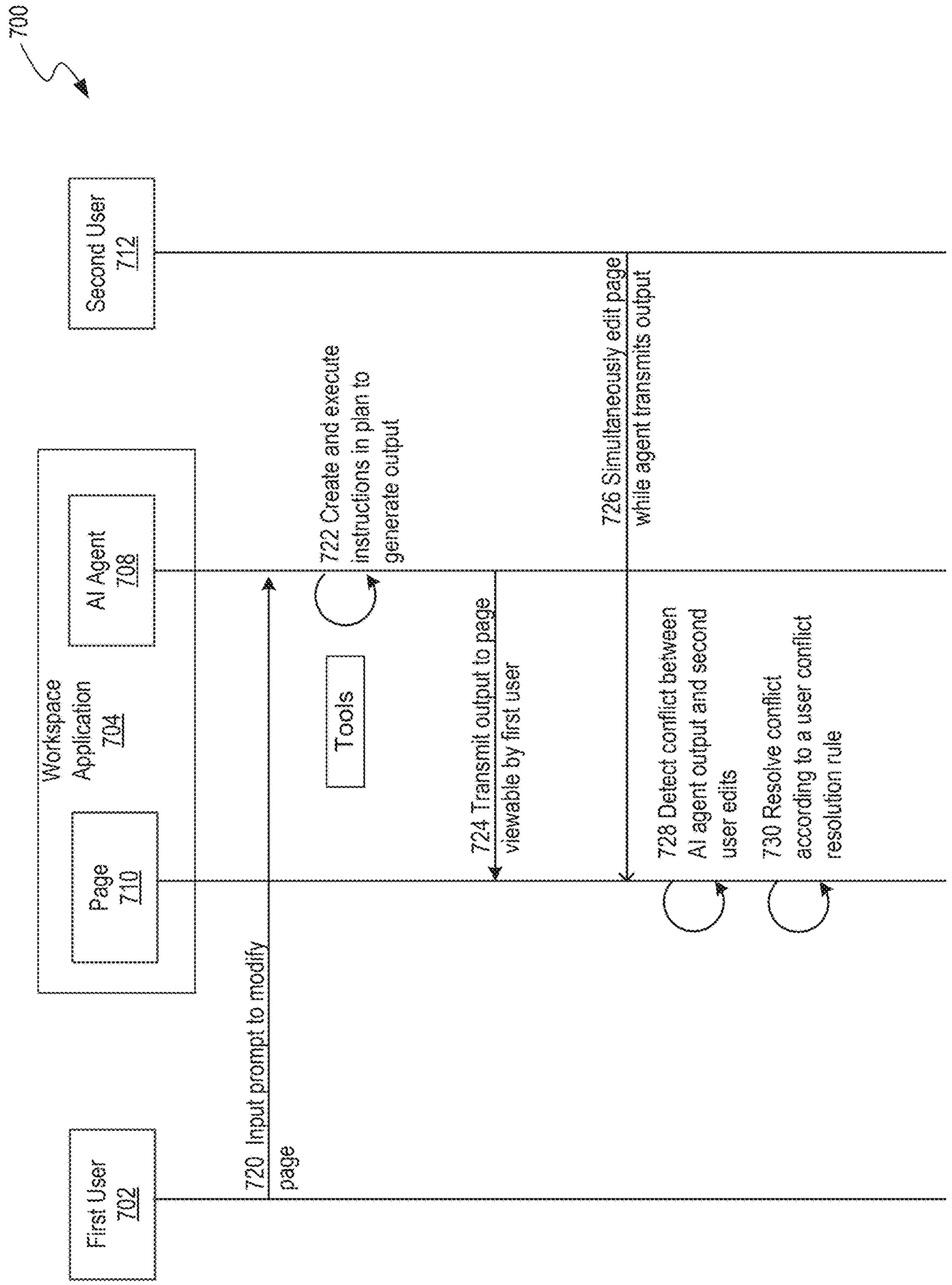
FIG. 7 is an example sequence of operations for resolving conflicts between modifications made to a page by an AI agent and a user.

FIG. 7 is an example sequence 700 of operations for resolving conflicts between modifications made to a page by an AI agent and a user. In some embodiments, a workspace application 704 (e.g., which may be the same as or generally similar to the workspace application 404 described in relation to FIG. 4 above) enables multiple users to simultaneously modify a page, the multiple users including an AI agent 708 (e.g., which may be the same as or generally similar to the AI agent 408 described in relation to FIG. 4 above). In such embodiments, the AI agent may execute one or more tools and/or perform other operations within the workspace application that are also performed by users, and it may therefore be computationally efficient for the workspace application's backend to treat the AI agent as a user. However, this gives rise to scenarios in which the actions of an AI agent may conflict with the actions of another user, just as the actions of two human users may conflict. Thus, the conflict resolution techniques described below help to avoid errors in page modification and enable a more consistent experience for users viewing/working within a page undergoing simultaneous modifications.

At operation 720, a first user 702 inputs a prompt into the workspace application 704. The first user 702 and the prompt may be the same as or generally similar to the user 402 and prompt 406 described in relation to FIG. 4 above, respectively. At operation 722, the AI agent 708 creates a plan based on the prompt and executes one or more instructions in the plan to generate an output. For example, the AI agent 708 may create and execute this plan following the iterative process described in relation to FIG. 4 above in which executing the plan includes executing one or more tools. At operation 724, the AI agent 708 transmits the output to a page 710, which is a page viewable by the first user 702 (e.g., a page to which the first user 702 has view access). The output is a modification of the page generated as a result of executing the one or more instructions.

At operation 726, simultaneous to the AI agent 708 transmitting the output to the page 710, a second user 712 edits the page 710 (e.g., modifies the page using one or more tools). The second user 712 is a user having permissions enabling editing of the page 710. In some embodiments, the first user 702 edits the page simultaneous to the AI agent 708 transmitting the output either in addition to or instead of the second user 712 performing the edits.

At operation 728, the workspace application 704 detects a conflict between the output of the AI agent 708 and the edit of the second user 712. A conflict results when the AI agent 708 and the second user 712 attempt to modify the same element of the page 710 and/or otherwise modify the page 710 in ways that are incompatible with one another, meaning that the two modifications may not both be rendered on the page 710 without creating an error and/or resulting in unintended modifications. Thus, at operation 730, the workspace application 704 resolves the conflict according to a user conflict resolution rule, enabling the page 710 to be updated in a predictable manner despite the conflict. For example, the user conflict resolution rule may dictate that, when the modifications of the AI agent 708 and the second user 712 conflict, one or the other of the modifications will simply be discarded in favor of the other. As another example, the modification requiring the least substantial change to the page 710 (e.g., the modification requiring fewer computational resources to perform) may be applied to the page in favor of the other modification, thereby helping to reduce the computational cost of modifying the page 710 while also reducing errors related to simultaneous modifications.

Figure 8:
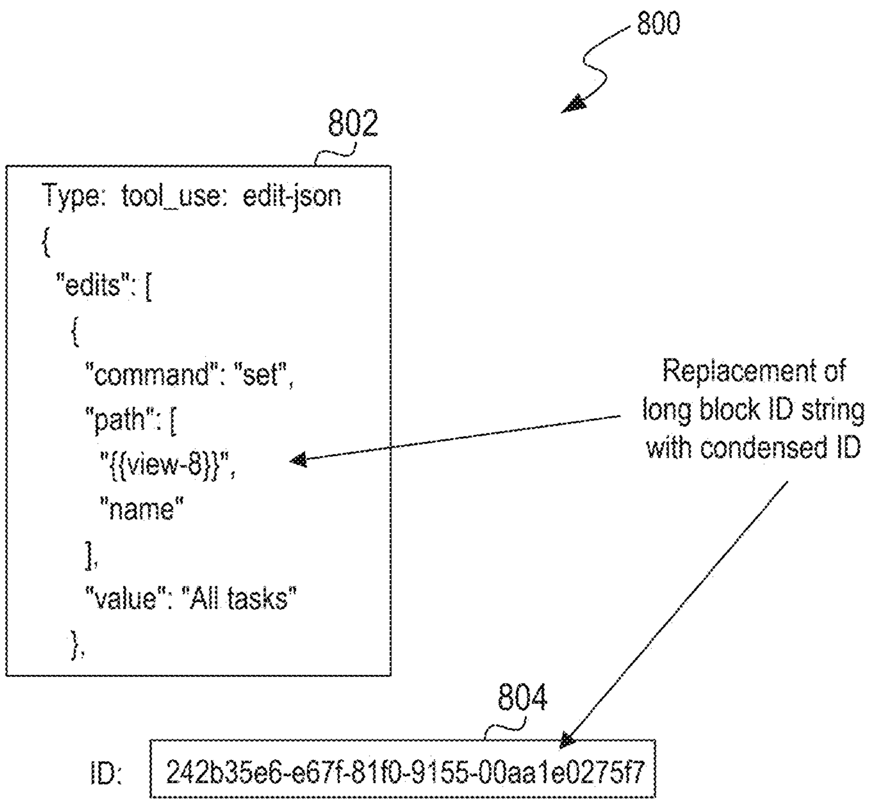
FIG. 8 is an example tool configuration for a tool within a workspace application including a data serialization language file and a block ID.

FIG. 8 is an example tool configuration 800 for a tool within a workspace application (e.g., the workspace application 404 described in relation to FIG. 4 above) including a data serialization language file 802 and a block ID 804. The data serialization language file 802 defines the particular function performed when the tool is executed, enabling an AI agent and/or another component of the workspace application to repeatedly perform the particular function by calling the tool. For example, as depicted in FIG. 8, the tool is an "edit-json" tool that enables editing of a JSON representation of a page and/or a database (e.g., in order to update that page/database). The "edit-json" tool includes a "path," which is an identifier of the page and/or database for which the JSON representation is to be edited.

In some embodiments where a tool includes a path for a page/database, the path is generated by compressing an identifier of the page/database into an AI-agent-readable identifier. For example, the page/database may be represented with a block ID 804, which is a string of characters uniquely identifying the page/database among other blocks in the workspace application. However, AI agents and/or the models invoked by those agents are prone to interpreting long character strings incorrectly (e.g., by misidentifying one of the characters). Thus, replacing the block ID 804 with a condensed identifier of the page/database may improve the reliability of tool execution, as the probability of incorrectly interpreting the identifier is comparatively lowered. In some embodiments, the block ID 804 is compressed by replacing the block ID with a sequential identifier indicating the number of block IDs that have been compressed. For example, as depicted in FIG. 8, the block ID 804 may be compressed into the AI-agent-readable identifier "view-8" because seven other IDs have been compressed previously. However, this example is not limiting and the AI-agent-readable identifier may be any identifier having a number of characters that is reliably interpreted by the AI agent.

Example Plan Execution Method Flow

Figure 9:
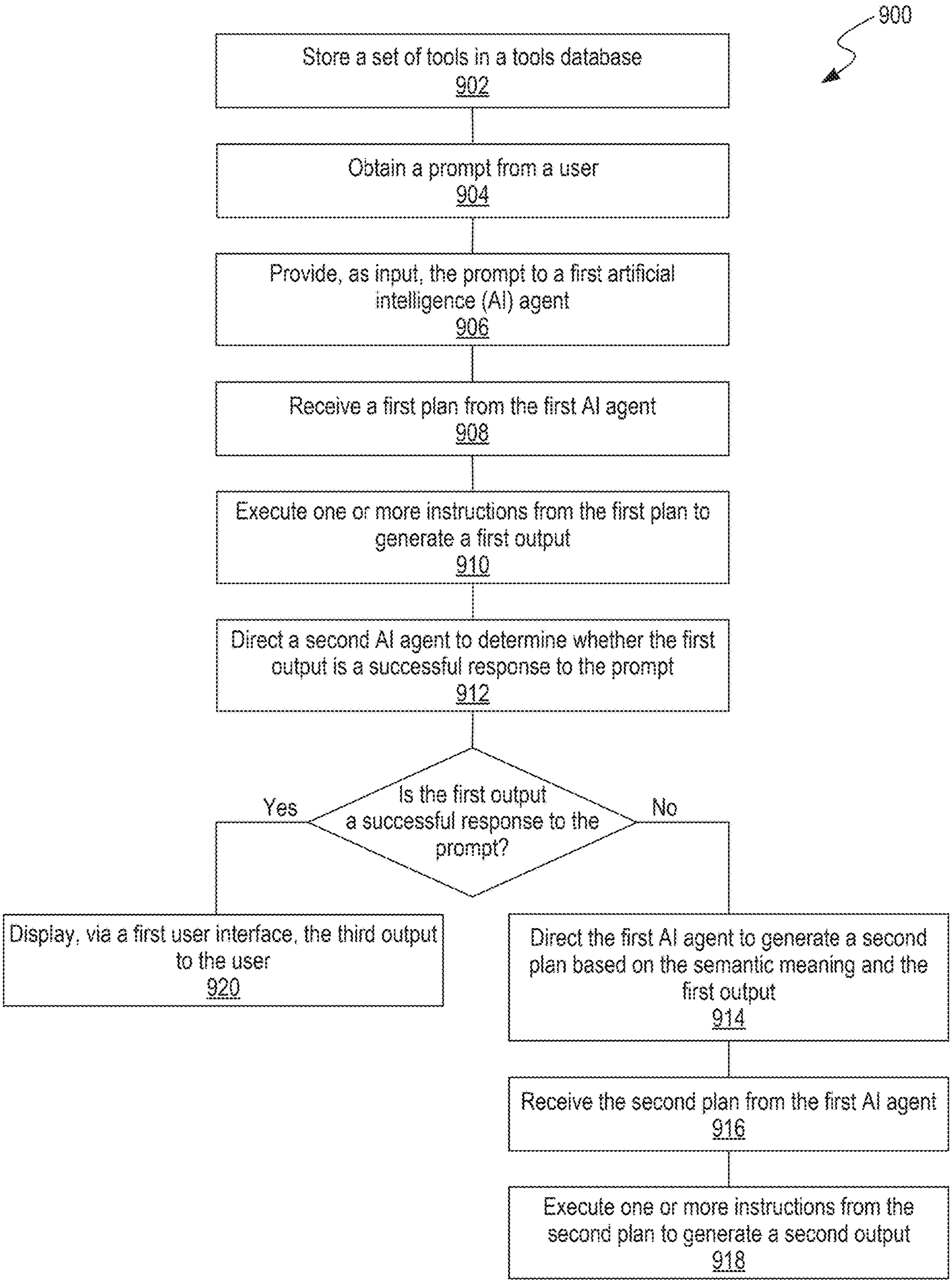
FIG. 9 is a flow diagram illustrating an example method of generating and displaying a response to a user prompt within a workspace application.

FIG. 9 is a flow diagram illustrating an example method 900 of generating and displaying a response to a user prompt within a workspace application. In some embodiments, the method 900 is performed by components of the example computer system illustrated and described in more detail in relation to FIG. 25 below and/or the workspace application 404 described in relation to FIG. 4 above. Likewise, embodiments can include different and/or additional operations or can perform the operations in different orders.

In operation 902, a set of tools is stored in a tools data store. For example, the set of tools may include at least one of a page creation tool, a page update tool, a page deletion tool, a database creation tool, a database update tool, a database deletion tool, or a database query tool. In some embodiments, each tool from the set of tools, when executed, performs a particular function within a workspace application and each tool from the set of tools is associated with a description of the particular function performed when the tool is executed. The tools data store may be the same as or generally similar to the tools data store 410 as described in relation to FIG. 4 above. The workspace application may be the same as or generally similar to the workspace application 404 as described in relation to FIG. 4 above. In operation 904, a prompt is obtained from a user. The prompt and the user may be the same as or generally similar to the prompt 406 and the user 402 as described in relation to FIG. 4 above, respectively.

In operation 906, the prompt is provided, as input, to a first AI agent. In some embodiments, the first AI agent determines a semantic meaning of the prompt, compares the semantic meaning to one or more descriptions associated with one or more tools from the set of tools, and, based on the comparing, determines a list of usable tools for responding to the prompt. In such embodiments, the first AI agent generates, based on the list of usable tools and the semantic meaning, a first plan including instructions for executing one or more of the tools from the list of usable tools in a predetermined order to respond to the prompt. The first AI agent and the first plan may be the same as or generally similar to the AI agent 408 and the plan 412 as described in relation to FIG. 4 above, respectively.

In operation 908, a first plan is received from the first AI agent. For example, the first plan may be generated by the first AI agent as described above or by another means enabling execution of the first plan to respond to the prompt. In some embodiments, the first plan includes an instruction to modify at least one of a page or a database. In these and other embodiments, a human-readable list of steps based on the first plan may be generated and display of the human-readable list of steps may be caused via a UI (e.g., as described in relation to the homepage UI 500 of FIG. 5 above).

In operation 910, one or more instructions from the first plan are executed to generate a first output. The first output can be the same as or generally similar to the output 414 as described in relation to FIG. 4 above. In some embodiments, a determination is made that executing a particular instruction from the first plan would include performing a high-risk function, and in response to the determination, display is caused, via a UI (e.g., the UI 416 as described in relation to FIG. 4 above), of a notification of performing the high-risk function. In such embodiments, before executing the particular instruction, a confirmation may be received from the user, via the second UI, of performing the high-risk function. The particular instruction may then be executed, the AI agent having received confirmation that the user approves of performing the high-risk function performed by said execution.

In operation 912, a second AI agent is directed to determine whether the first output is a successful response to the prompt. The second AI agent may be a separate AI agent from the first AI agent or may be the same AI agent performing this determination. Depending on the determination made by the second AI agent, the method 900 proceeds in different ways.

Operations 914, 916, and 918 reflect the alternative where an indication is received, from the second AI agent, that the first output is not a successful response to the prompt. In operation 914, the first AI agent is directed to generate a second plan based on the semantic meaning and the first output. In operation 916, the second plan is received from the first AI agent. Finally, in operation 918, one or more instructions from the second plan are executed to generate a second output. Thus, the second output represents a second attempt to generate a successful response to the prompt. In some embodiments, the second AI agent may be directed to determine whether the second output is a successful response to the prompt and, if not, the operations 914-918 may be repeated until an output is generated that the second AI agent determines is a successful response, at which point operation 920 (described below) is performed.

Operation 920 reflects the alternative where an indication is received, from the second AI agent, that the first output is a successful response to the prompt. In operation 920, display is caused, via a first UI, of a third output to the user. The first UI can be the same as or generally similar to the UI 416 as described in relation to FIG. 4 above.

In some embodiments, the first output is a partial response to the prompt (e.g., as described in relation to the output 414 of FIG. 4 above). In such embodiments, in response to generating the first output, a second UI is updated to include a status update corresponding to the first output. Then, upon receiving an indication from the second AI agent that the first output is a successful partial response to the prompt, a remaining one or more instructions from the first plan may be executed to generate an additional output. The additional output differs from the first output and reflects information gathered during execution of all the instructions from the first plan. Analogously to the description above, the second AI agent may alternatively determine that the first output is not a successful partial response, causing similar operations to operations 914, 916, and 918 to be performed in which plans and outputs are repeatedly generated until a successful partial response is generated.

In these and other embodiments, while generating at least one of the first output or the second output, a first modification to a page or a database is received from a second user and a conflict is detected between the first modification and a second modification caused by executing an instruction in the first plan to modify at least one of the page or the database. In such embodiments, the conflict may be resolved according to a user conflict resolution rule for the workspace application (e.g., as described in relation to FIG. 7 above).

In some embodiments, before executing an instruction to modify at least one of a page or a database, an identifier of at least one of the page or the database is compressed into an AI-agent-readable identifier and the AI-agent-readable identifier is included in a data serialization file representation of at least one of the page or the database. Additionally or alternatively, before executing the instruction, at least one of the page or the database may be converted into a markup language representation of the page or the database. In such embodiments, while executing the instruction, a third AI agent may interact with the markup language representation to modify at least one of the page or the database.

AI Agent Integrations

Figure 10:
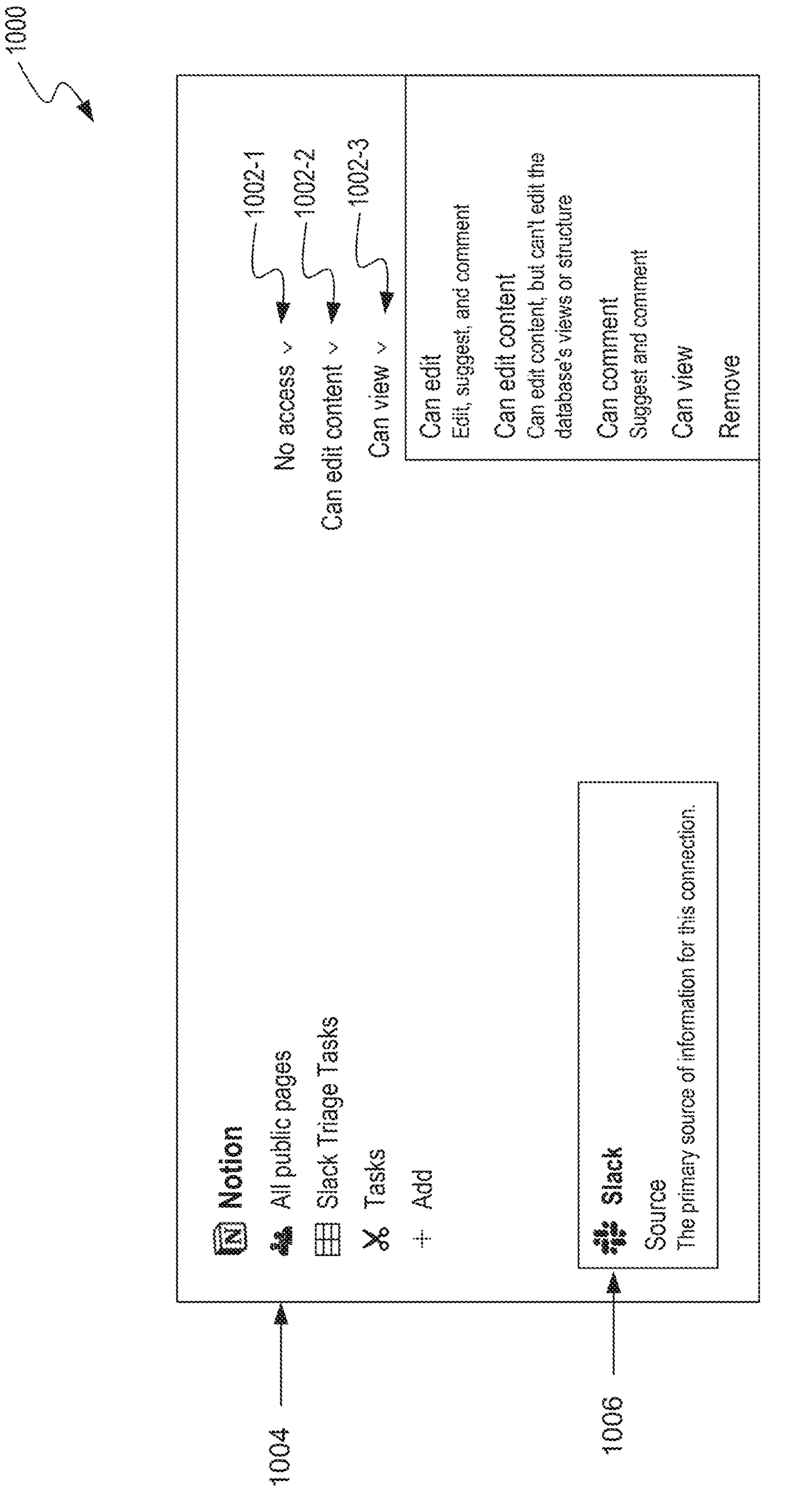
FIG. 10 is an example of an integration UI for defining an integration.

FIG. 10 is an example of an integration UI 1000 for defining an integration. An integration is a heuristic or other rule that, when designated to/associated with an AI agent (e.g., the AI agent 408 described in relation to FIG. 4 above), governs the actions that may be taken by the AI agent. In some embodiments, an integration governs the actions of an AI agent by including tools that the AI agent can execute to perform actions and permissions determining the level of access granted to the AI agent within a workspace application (e.g., the workspace application 404 described in relation to FIG. 4 above).

As depicted in FIG. 10, a definition of an integration 1004 is received from a user via the integration UI 1000. The user may be the same as or similar to the user 402 as described in relation to FIG. 4 above. The integration 1004 may include a set of access permissions 1002 for the AI agent as well as a set of tools executable by the AI agent. The set of access permissions 1002 may include permissions that allow the AI agent to, for example, view, comment on, edit content within, or edit the structure of blocks, discussed in relation to FIG. 1, within a workspace application, including pages, workspaces, databases, or any other data representation within the workspace application. The level of access that a user may provide to an AI agent within an integration 1004 is block dependent, meaning that the level of access an AI agent has with the set of access permissions 1002 within the integration 1004 may vary across different blocks. For example, as depicted in FIG. 10, a first access permission 1002-1 does not permit access to all public pages of the workspace application, while a second access permission 1002-2 permits edit access to a block called "slack triage tasks" and a third access permission 1002-3 permits view-only access to a block called "tasks."

In some embodiments, a set of access permissions of the user determines the level of access the user may grant to the AI agent via defining and designating the integration 1004 as a heuristic for the AI agent. For example, the set of access permissions 1002 of an AI agent, defined via the integration 1004, may be limited to a "lower" level of access than the user is permitted by the user's set of access permissions. As a specific instance of this example, when the set of access permissions of the user grants a non-owner level of access to a database, the user is unable to grant the AI agent "edit" access via the integration 1004. Instead, the AI agent in this instance is limited to a set of access permissions 1002 providing access levels below "edit" access, such as comment access, view-only access (e.g., the third access permission 1002-3), or no access (e.g., the first access permission 1002-1).

In other embodiments, the set of access permissions of the user grants an owner level (e.g., a highest level) of access to a database. In these embodiments, the set of access permissions 1002 included in the integration 1004 may include an access permission that provides a highest level of access to the database for the AI agent. In an example, the highest level of access is edit access (e.g., the second access permission 1002-2) that allows the AI agent to edit content within as well as the structure or formatting of the database. In some embodiments where the user attempts to edit the AI agent's set of access permissions 1002 to provide the AI agent with a permission level that is prohibited in relation to the user's own access permissions, the workspace application will output a message informing the user of the lack of access permissions.

The set of tools included in the integration 1004 may include one or more tools accessible/executable by the AI agent as discussed in relation to FIG. 1 and/or FIG. 4. The set of tools included as part of the integration 1004 may be defined by the user as part of an input of the user, as discussed further in relation to FIG. 11 below. Each tool from the set of tools is associated with a description of the particular function performed when the tool is executed, as previously discussed in relation to FIG. 4. In some embodiments, the set of tools and associated tool descriptions are stored in a tools data store, which may be the same as or similar to the tools data store 410 as discussed in relation to FIG. 4.

The integration 1004 may be stored in an integrations data store. The integrations data store may be the same as or similar to the integrations data store 418 as discussed in relation to FIG. 4. The AI agent may follow an integration associated with the AI agent from within the integrations data store. In some embodiments, the integrations data store is a user-specific data store for integrations that may be designated to AI agents by the user. In such embodiments, the user may designate an integration from the user-specific data store to an AI agent during a communication session (e.g., a text- or voice-based chat session) with the user. In some embodiments, during the communication session with the user, the AI agent accesses and follows various integrations from the user-specific data store in order to execute instructions from, provided to, and/or generated by the AI agent. In other embodiments, the integrations data store is a workspace-specific data store for integrations that may be designated to AI agents by any user having access to a particular workspace. In such embodiments, the integrations data store contains integration 1004 with a set of access permissions 1002 and a set of tools associated with a particular workspace rather than with a particular user.

In some embodiments, the set of access permissions and set of tools stored as part of the integration 1004 includes access permissions and tools that allow the AI agent to interact with (e.g., view, edit content within) a third-party application (e.g., Slack®, Zendesk®, etc.). As depicted in FIG. 10, a third-party access integration 1006 for interacting with a third-party application is created and stored in the integrations data store. In the illustrated embodiment, the third-party application is Slack®; however, this example is non-limiting. Another third-party application to which the workspace application may connect (e.g., via an API) may be the third-party application for the third-party access integration 1006. In some embodiments, the third-party access integration 1006 enables the AI agent to interface with the third-party application by sending an API request to a server hosting the third-party application to establish a secure connection with the third-party application. Further, in such embodiments, once the workspace application sends an API request to the server, the user may be prompted to log in to the third-party application to provide the AI agent with permission to access the user's content and data stored within the third-party application, such as communication channels and/or message threads. A further example of an integration with a third-party application is discussed in relation to FIG. 12 below.

Example User Interfaces

Figure 11:
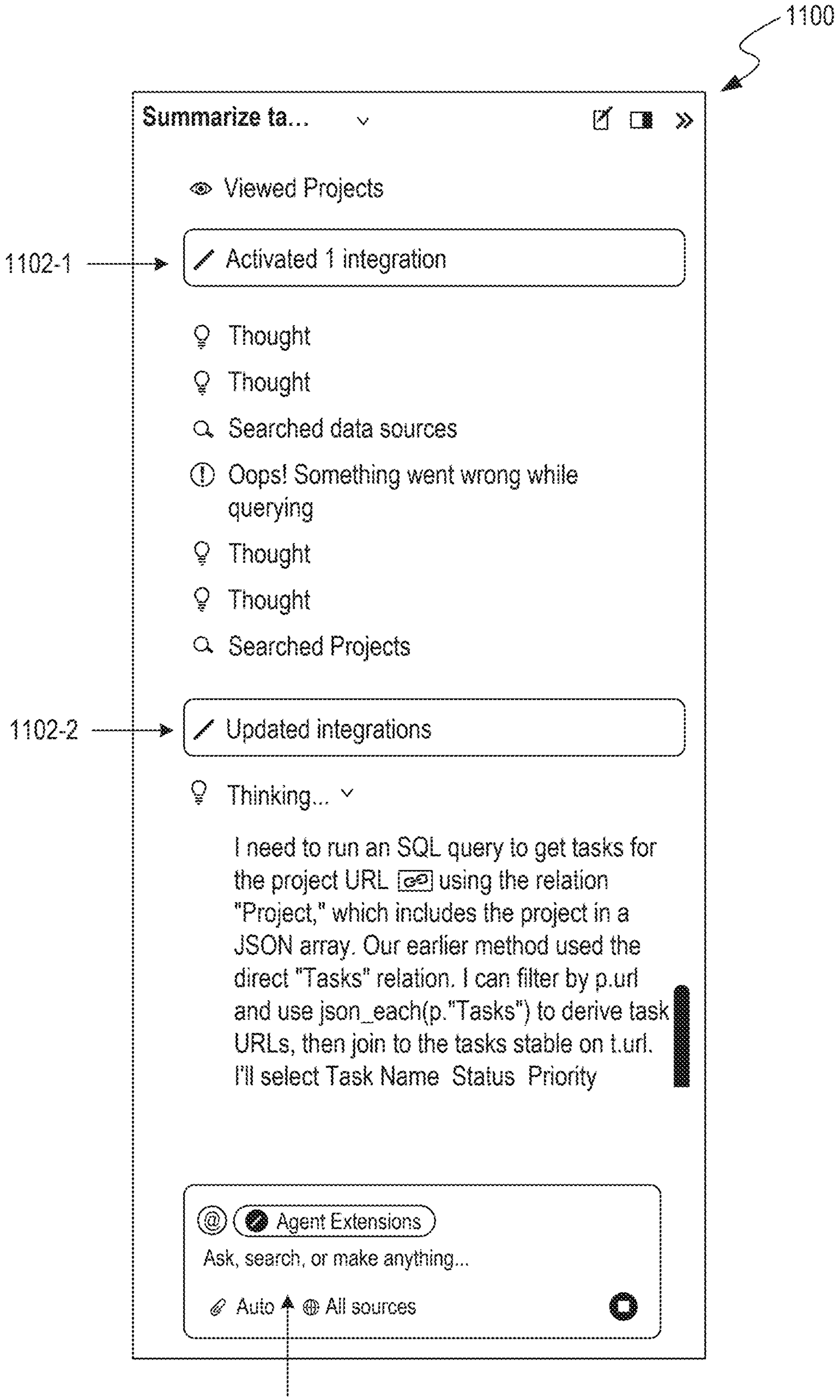
FIG. 11 illustrates an example communication interface in which a user engages in a communication session with an AI agent.

FIG. 11 illustrates an example communication interface 1100 in which a user engages in a communication session with an AI agent. The user may be the same as or similar to user 402 of FIG. 4. The AI agent may be the same as or similar to AI agent 408 as discussed in relation to FIG. 4. Within the communication interface 1100, the user may provide a prompt to the AI agent. The prompt may be the same as or similar to prompt 406 of FIG. 4 and may be provided (e.g., as text or audio) via an input field 1108, which may be the same as or generally similar to the input field 502 described in relation to FIG. 5 above.

Based on the user's prompt, the AI agent may activate an integration, which may be the same as or similar to the integration 1004 as described in relation to FIG. 10 and may be a set of access permissions combined with a set of tools usable by the AI agent. The set of access permissions may be the same as or similar to the set of access permissions 1002 as discussed in relation to FIG. 10. In some embodiments, the user's prompt causes the AI agent to create and execute one or more instructions in a plan (e.g., as described in relation to FIG. 4 above) to complete the user's request. In such embodiments, some instructions in the plan may be performed by the AI agent while following an integration in order to utilize one or more tools from a set of tools included in the integration and/or access, view, or edit certain pages, databases, or workspaces within the workspace application according to the access permissions included in the integration. The workspace application may be the same as or similar to the workspace application 404 of FIG. 4.

In some embodiments, a communication session is initialized (e.g., via the communication interface 1100) between the AI agent and the user. During the communication session, the user may send prompts (e.g., via the input field 1108) to the AI agent and receive responses from the AI agent via a UI. The UI may be the same as or similar to the UI 416 as discussed in relation to FIG. 4. In some embodiments, the UI includes the communication interface 1100. In these and other embodiments, the integration is activated for the communication session, meaning the integration is designated as a heuristic for the AI agent to follow while responding to prompts received from the user during the communication session via the input field 1108 of the communication interface 1100. The set of tools included in the integration may be loaded into a context window of the AI agent. The context window may be a collection of data that the AI agent references while generating an output (e.g., a response to a prompt). Activation of an integration may be indicated within the communication interface 1100 by a first indicator 1102-1, as depicted in FIG. 11.

The designation of the integration as a heuristic for the AI agent to follow may provide efficiencies in computational expense during processing performed by the AI agent by providing a limited amount of context for the AI agent to process that serves as a low-cost "guide" or "short-cut" for the AI agent to follow as the AI agent creates a plan and/or executes a set of instructions based on the user's prompt. In some embodiments, designating the integration as a heuristic for the AI agent to follow comprises providing context from the communication session to a second AI agent that directs actions of the AI agent. The second AI agent may be a separate AI agent from the AI agent or may be the same AI agent. In some embodiments, a determination is received from the second AI agent that the integration is relevant to the context from the communication session and, in response to receiving the determination, the integration is designated as the heuristic. Thus, the AI agent is provided with relevant context that limits the scope of the AI agent's actions, improving both efficiency and responsiveness of the AI agent.

In some embodiments, the set of access permissions stored as part of the integration permits the AI agent to modify a set of instructions associated with the AI agent itself. The set of instructions may describe one or more actions for the AI agent to perform and may be derived from the user's prompt to the AI agent. In some embodiments, the AI agent, before generating a response to the prompt, predicts that the prompt cannot be responded to in accordance with the set of instructions. For example, the AI agent may determine, based on a semantic analysis of the prompt, that performing the set of instructions associated with the AI agent would perform actions that would not generate a complete response to the prompt and/or would otherwise be unresponsive to the prompt. In such embodiments, based on the prompt and the integration associated with the AI agent, the AI agent may modify the set of instructions. As an example, the AI agent may modify the set of instructions to incorporate various steps or tools from the set of tools into the plan to execute the user's request. In other embodiments, the AI agent may determine that the integration, which includes an associated set of access permissions and set of tools usable by the AI agent, is insufficient to execute the set of instructions (e.g., does not provide tools and/or access permissions enabling the set of instructions to be executed). In such embodiments, the AI agent updates the associated integration by updating the set of access permissions and/or the set of tools and may cause display of a second indicator 1102-2 signaling that the integration has been updated. Once updated, the AI agent may attempt to re-execute the set of instructions using the updated integration.

In some embodiments, during the communication session, a prompt is received from the user via the UI. The prompt is provided as input to the AI agent, and the AI agent may generate a response to the prompt by executing one or more tools from the set of tools in accordance with the set of access permissions. In some embodiments, a response is received from the AI agent, and display of the response is caused via the UI.

Figure 12:
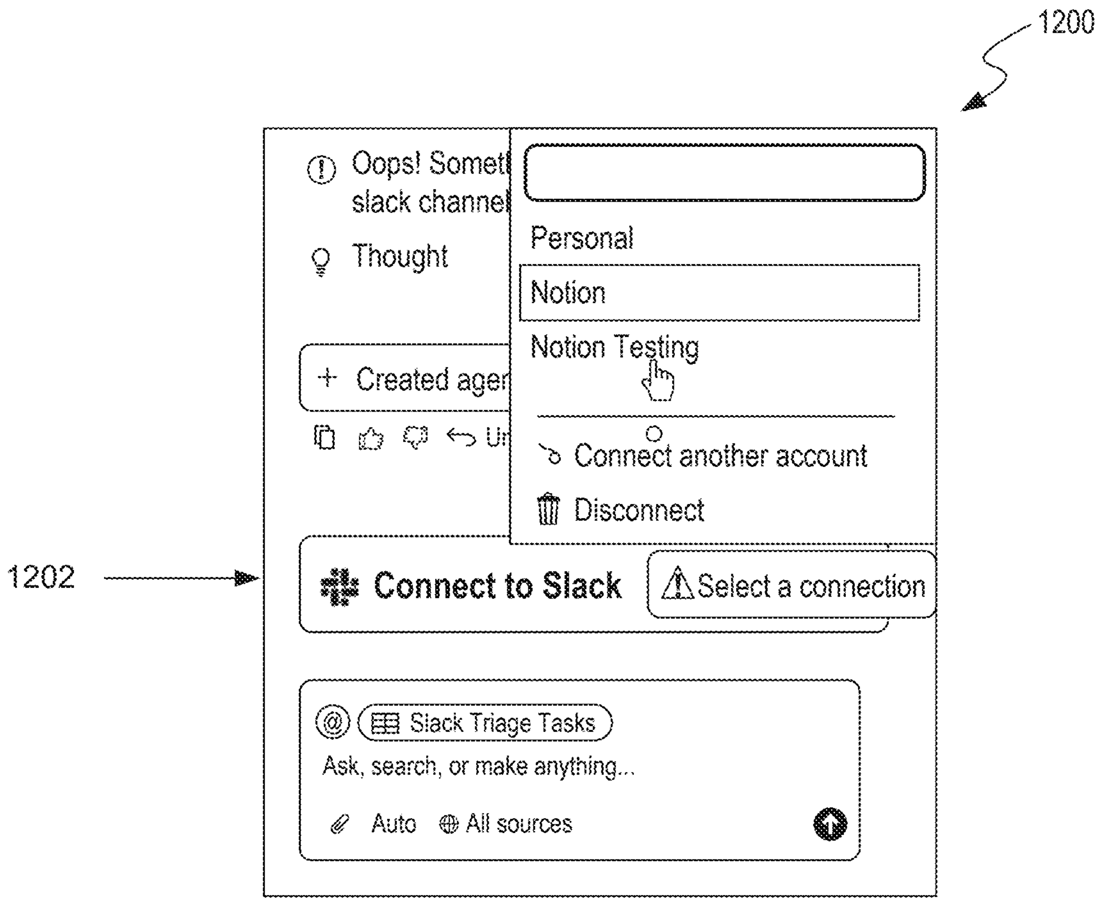
FIG. 12 displays another embodiment of a communication interface displaying a communication session between a user and an AI agent.

FIG. 12 displays another embodiment of a communication interface 1200 displaying a communication session between a user and an AI agent. The user may be the same as or similar to the user 402 of FIG. 4. The AI agent may be the same as or similar to AI agent 408 of FIG. 4. As depicted in FIG. 12, the user has provided a prompt (e.g., the prompt 406, as described in relation to FIG. 4 above), which triggered an activation of an integration for interaction with a third-party application (e.g., Slack®, Zendesk®, or any other third-party application that is able to interface with the workspace application). For example, after initializing the communication session, a selection of the integration via a second UI may be received from the user. In response to the selection, the integration may be designated as a heuristic for the AI agent to follow while responding to prompts received from the user during the communication session. The second UI may be the same as or similar to the UI 416 discussed in relation to FIG. 4.

In some implementations, as depicted in FIG. 12, the AI agent determines that the set of tools and/or access permissions associated with an AI agent (e.g., by integrations designated as heuristics for the AI agent) are insufficient to allow the AI agent to respond to the user's prompt. In response, the AI agent may attempt to update its own integrations to allow the AI agent to more completely respond to the prompt. However, in some embodiments, the AI agent does not have a set of access permissions enabling the AI agent to update its own integrations without user intervention. In such embodiments, the AI agent may make an access permissions request 1202 to the user. The access permissions request 1202 is a request, displayed to the user, to connect the workspace application to a third-party application by designating an integration enabling third-party application access for the AI agent. In an example, as shown in FIG. 12, the AI agent determines that, to complete a set of instructions related to the user's prompt, a set of access permissions and/or tools stored within a particular third-party application integration is desirable. Therefore, via the communication interface 1200, the user is prompted to enable the particular third-party application integration (e.g., an integration with Slack®). The user may enable the integration by selecting a pre-existing communication channel within the third-party application to which the AI agent may connect, causing access to this communication channel to be stored in the set of access permissions of the particular third-party application integration. In some embodiments, the user disconnects the workspace application including the AI agent from the third-party application. In such embodiments, disconnecting from the third-party application may remove the access permission to access the third-party application from the set of access permissions stored as part of the integration.

Agent and Sub-Agent Hierarchy

Figure 13:
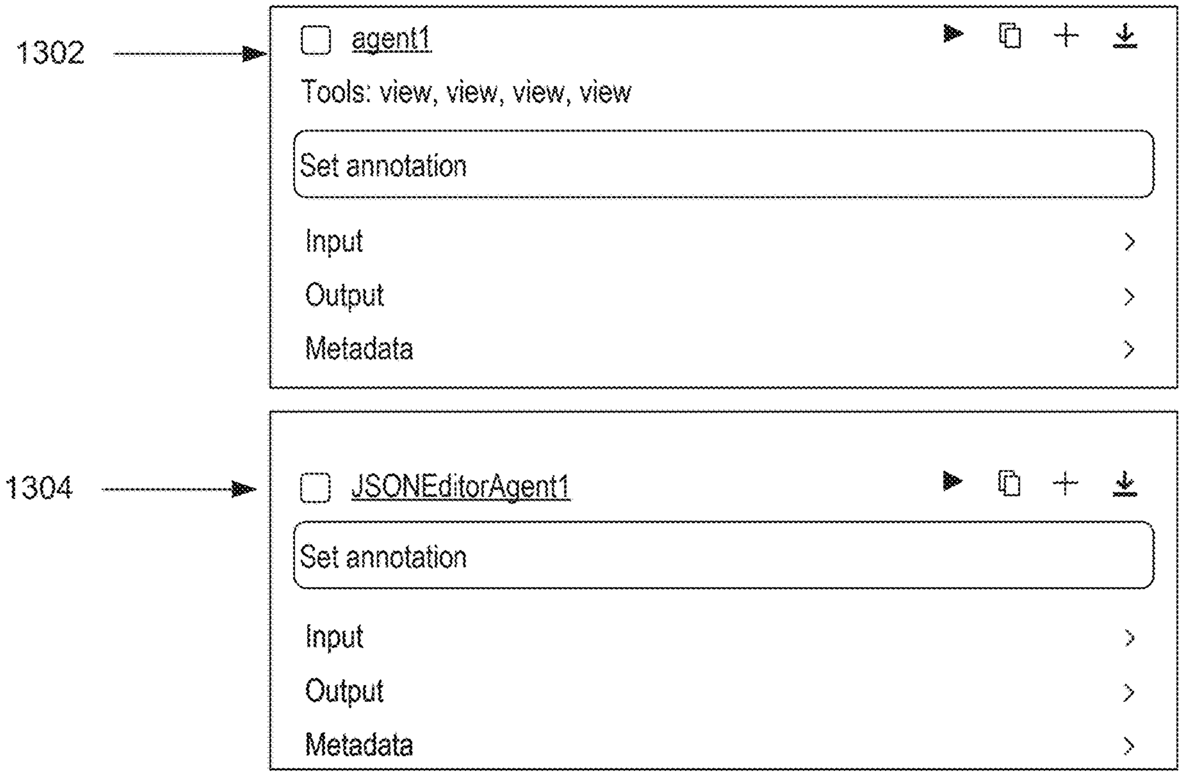
FIG. 13 illustrates an example of an AI agent and an associated AI sub-agent.

FIG. 13 illustrates an example of an AI agent 1302 and an associated AI sub-agent 1304. In the illustrated embodiment, the AI sub-agent 1304 is JSONEditorAgent1 and is configured to perform the particular task of editing JSON files. However, the AI sub-agent 1304 may be any AI sub-agent included in a workspace application configured to perform one or more particular tasks. The workspace application may be the same as or generally similar to the workspace application 404 discussed in relation to FIG. 4 above. In some embodiments, the AI agent 1302 determines that, as part of executing a set of instructions, there is an AI sub-agent 1304 within the workspace application that is associated with an integration enabling successful execution of the set of instructions. The AI agent 1302 may then direct this AI sub-agent 1304 to execute one or more instructions from the set of instructions rather than executing those instructions itself. For example, the AI sub-agent 1304 may be associated with an integration enabling the AI sub-agent 1304 to modify other integrations within an integrations data store (e.g., the integrations data store 418 described in relation to FIG. 4 above). Continuing with the same example, an updated definition of an integration in the integrations data store may be received from the user and the AI sub-agent 1304 may be directed by the AI agent 1302 to modify the integration and therefore the integrations data store based on the updated definition.

In some embodiments, the AI sub-agent 1304 has a lower level of access permissions compared to the AI agent 1302. In these and other embodiments, the integration associated with the AI sub-agent 1304 allows the AI sub-agent 1304 to access different tools from the set of tools than the AI agent 1302. The number of tools accessible by the AI sub-agent 1304 may be less than the number of tools accessible by the AI agent 1302. The AI sub-agent 1304, however, may be able to access the same number of tools as, or more tools than, the AI agent 1302. As discussed above in relation to FIG. 11, the AI agent 1302 may determine that the integration, with an associated set of access permissions and set of tools usable by the AI agent 1302, is insufficient to execute the set of instructions. In some embodiments, executing one or more instructions using the AI sub-agent 1304 instead of the AI agent 1302 conserves computational resources, as the AI sub-agent 1304 is configured to perform a narrower set of tasks (e.g., is associated with more restrictive access permissions and/or a smaller set of tools) and therefore iterates over a smaller decision space than the AI agent 1302, requiring comparatively less processing to be performed.

Example AI Agent Integration Method Flow

Figure 14:
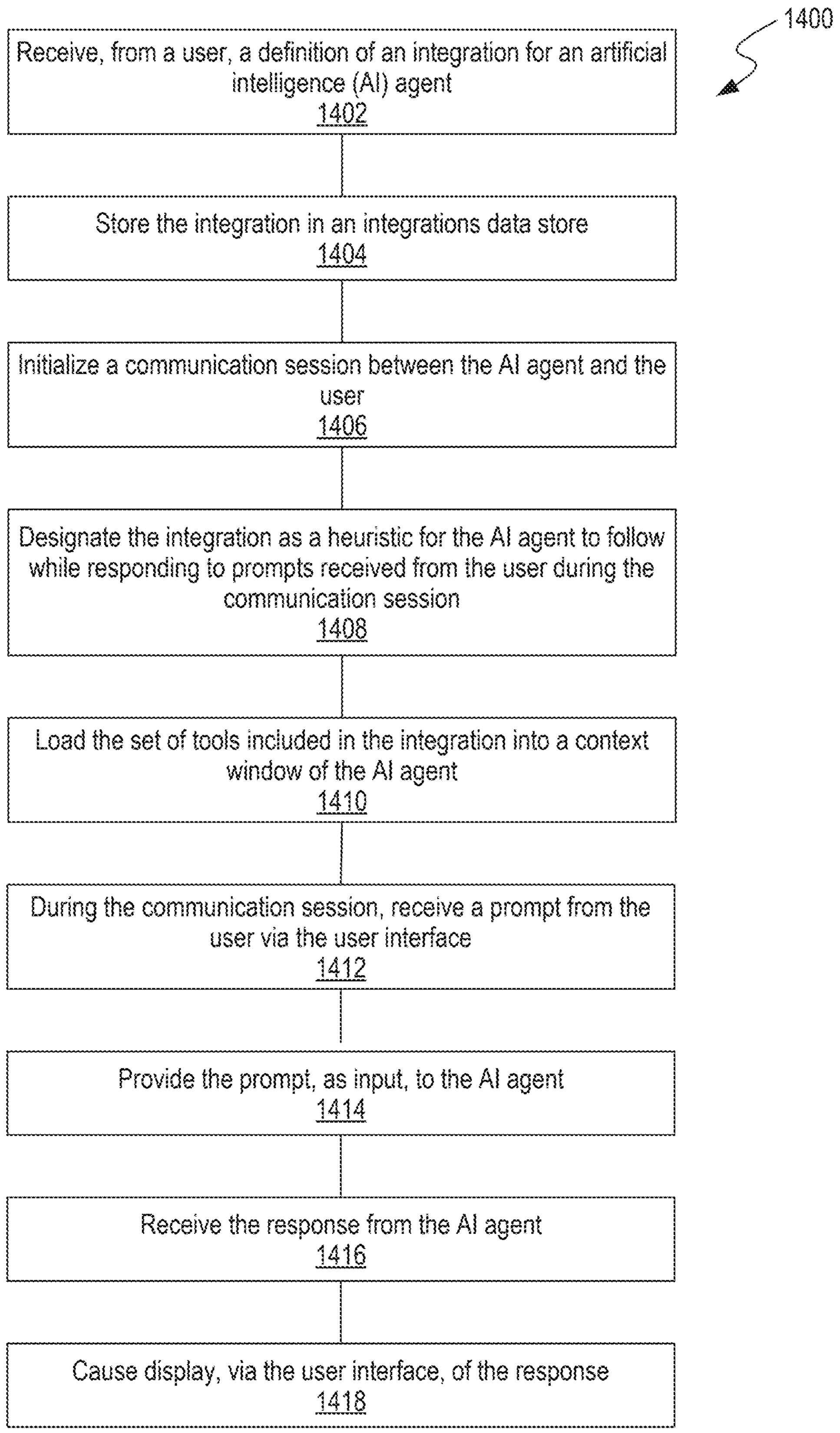
FIG. 14 is a flow diagram illustrating an example method of receiving, storing, and utilizing an integration within a workspace application.

FIG. 14 is a flow diagram illustrating an example method 1400 of receiving, storing, and utilizing an integration within a workspace application. In some embodiments, the method 1400 is performed by components of the example computer system illustrated and described in more detail in relation to FIG. 25 below and/or the workspace application 404 described in relation to FIG. 4 above. Likewise, embodiments can include different and/or additional operations or can perform the operations in different orders.

In operation 1402, a definition of an integration for an AI agent is received from a user. In some embodiments the AI agent and the user are the same as or similar to the AI agent 408 and the user 402 as discussed in relation to FIG. 4 above. The integration may be the same as or similar to the integration 1004 as discussed in relation to FIG. 10 above. The integration may include a set of access permissions for the AI agent and a set of tools executable by the AI agent. In some embodiments, the set of access permissions is based on an access permission of the user. The workspace application may be the same as or generally similar to the workspace application 404 as described in relation to FIG. 4 above.

In operation 1404, the integration is stored in an integrations data store. In some embodiments, the integrations data store is accessible by the AI agent and/or other AI agents and AI sub-agents of the workspace application. The integrations data store may be the same as or generally similar to the integrations data store 418 as described in relation to FIG. 4.

In operation 1406, a communication session is initialized between the AI agent and the user. During the communication session, the user may send prompts to the AI agent and receive responses from the AI agent via a UI. In some embodiments, the prompt is the same as or generally similar to prompt 406 as described in relation to FIG. 4. In some embodiments, the UI is the same as or generally similar to the communication interface 1100 or the communication interface 1200 as discussed in relation to FIGS. 11 and 12, respectively, and the user may communicate via an input field, which may be the same as or generally similar to the input field 502 or 608, as described in relation to FIG. 5 and FIG. 6, respectively.

In operation 1408, the integration is designated as a heuristic for the AI agent to follow while responding to prompts received from the user during the communication session. In some embodiments, the set of access permissions and the set of tools that are part of the integration enable the AI agent to generate a successful response to a prompt from the user. The set of access permissions may be the same as or similar to the set of access permissions 1002 as described in relation to FIG. 10. As previously described, a successful response is an output that, based on a determination by the AI agent, is predicted to be satisfactory to the user and provides the user with enough information to feel as if the prompt has been fulfilled and/or addressed completely. Designating the integration as a heuristic for the AI agent may provide computational efficiency benefits in that the designation may limit the data quantity and locations that the AI agent utilizes in forming a response to the user.

In operation 1410, the set of tools included in the integration is loaded into a context window of the AI agent. In some embodiments, the set of tools includes one or more of the tools described in relation to FIG. 1 and/or FIG. 4 above. By loading the set of tools included in the integration into a context window of the AI agent, greater computational efficiency may be achieved in responding to the user's prompt. The AI agent may more easily access the set of tools with fewer search steps in the tools data store or integrations data store required to locate the proper set of tools and create the plan to respond to the user, in comparison to an embodiment in which the set of tools is not loaded into a context window of the AI agent.

In operation 1412, a prompt from the user is received via the UI. As described above in the discussion of FIG. 4, the prompt may be the same as or similar to prompt 406. In some embodiments, the prompt includes a task or set of tasks for the AI agent to complete. In operation 1414, the prompt is provided as input to the AI agent. In some embodiments, the AI agent generates, as output, a response to the prompt by executing one or more tools from the set of tools in accordance with (e.g., following the permissions granted by) the set of access permissions.

In operation 1416, the response is received from the AI agent. In operation 1418, the response is caused to be displayed via the UI. In some embodiments, the response is a human-readable, natural language output to the user. In some embodiments, the response involves the creation of, or edits to, a page, database, or workspace within the workspace application or a third-party application. The response may include any result from the execution of any of the tools from the set of tools associated with any integration utilized by the AI agent in the response to the prompt from the user.

Defining and Calling Agents

Figure 15:
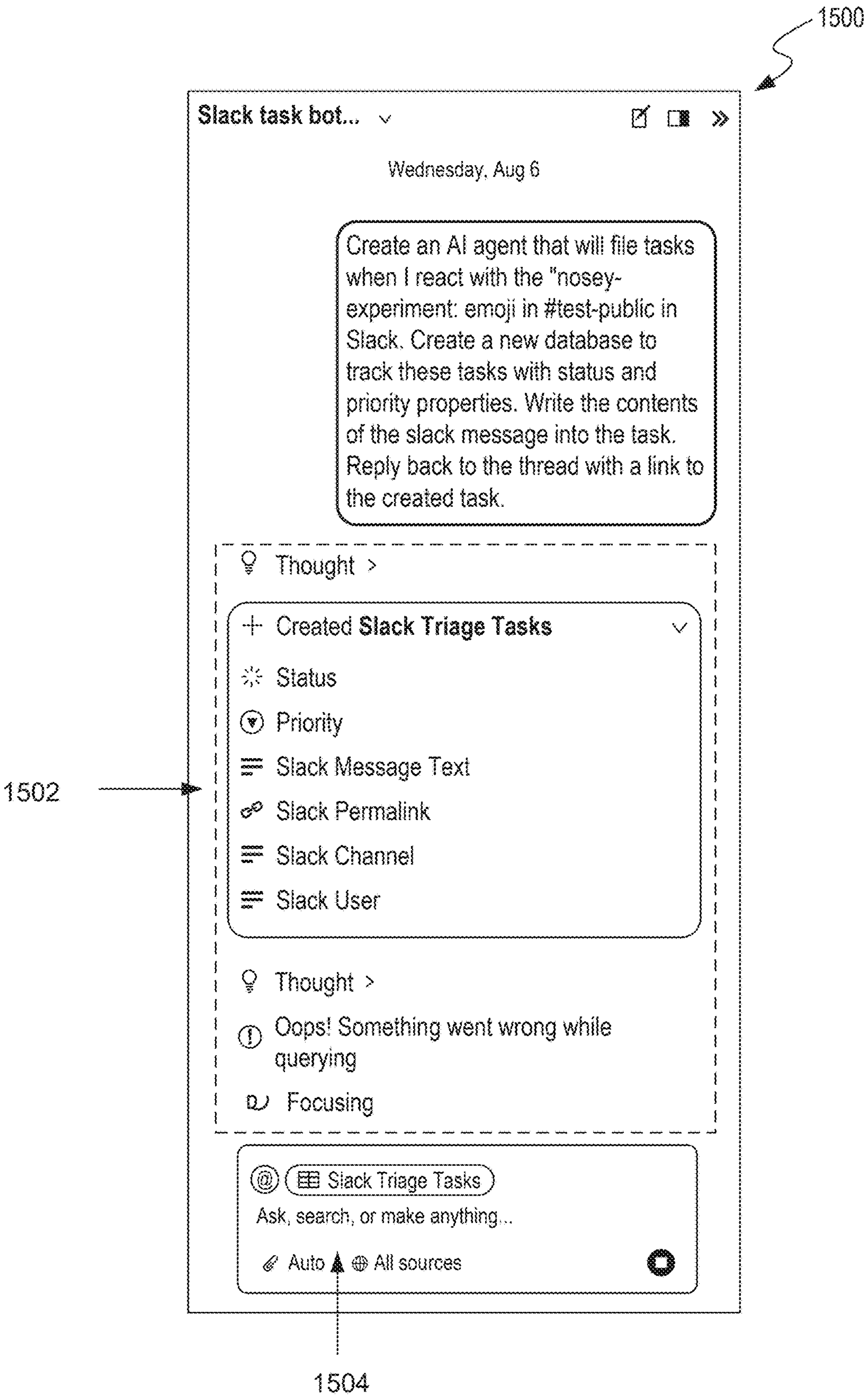
FIG. 15 shows an example communication interface in which a user inputs a prompt via an input field.

FIG. 15 shows an example communication interface 1500 in which a user inputs a prompt via an input field 1504. In some embodiments, the user will input (e.g., via the input field 1504) a request to create an AI agent that will complete certain tasks. The prompt and AI agent may be the same as or generally similar to the prompt 406 and the AI agent 408 described in relation to FIG. 4 above. The user may be the same as or generally similar to the user 402 discussed in relation to FIG. 4 above. In some embodiments, an AI agent is defined by/configured with a name, an icon, a set of instructions, and/or a set of integrations. The name and icon may be a unique textual identifier and a visual identifier, respectively, of an AI agent that are displayed within a UI of a workspace application (e.g., the workspace application 404 described in relation to FIG. 4 above). The set of instructions may describe one or more actions for the AI agent to perform upon occurrence of a trigger. The trigger is a discrete event in response to which the one or more actions may be performed. In some embodiments, the trigger is a particular modification to a row of a database.

In some embodiments, each integration in the set of integrations includes a set of access permissions for the AI agent and a set of tools executable by the AI agent. Each tool from the set of tools, when executed, may perform a particular function within a workspace application. Further, each tool from the set of tools may be associated with a description of the particular function performed when the tool is executed. As depicted in FIG. 15, the user inputs a prompt requesting to create an AI agent that includes an integration with a third-party application, as described in relation to FIG. 10 above. Specifically, the user's prompt includes a request to create a new database within the workspace application to track occurrences of a specific emoji within a specific third-party application that is accessible by the AI agent. The occurrence of the specific emoji is an example of a trigger that may result in the AI agent performing a specific action. In the example, the user includes specific metrics or features for the AI agent to track and include within the newly created database. Such an example is non-limiting, as the AI agent may additionally or alternatively include integrations within the workspace application or with other third-party applications. Further, the user's prompt may include the same, similar, or various other task requests for the AI agent to complete; the above example simply serves as an example of one implementation of the user inputting a request to the system to create an AI agent capable of completing various tasks for the user. Likewise, the specified trigger may be a trigger other than an emoji reaction, such as a text message, a thread creation, a mention, a support ticket creation, and/or the like, either within the workspace application or a third-party application.

In response to the user's prompt, the system may provide an output 1502 to the user via the communication interface 1500 indicating that the AI agent is creating and/or executing instructions in a plan to provide a successful output to the user's prompt. The output 1502 to the user may be a human-readable list of steps, including natural language text that describes a set of instructions in the plan, thereby outlining for the user the process that will be performed in response to the prompt entered via the input field. The output 1502 to the user may include an indication that the AI agent is "thinking" or in the process of generating the plan and/or executing an instruction. In some embodiments, the output 1502 to the user includes an indication that a requested database was successfully created. For example, the indication to the user regarding database creation may include one or more data fields/columns of the database. In some embodiments, the AI agent determines that the instructions in the set of instructions are insufficient to provide the user with a successful output. In such embodiments, the AI agent responsively modifies the set of instructions to create a second plan that may provide a successful output to the user.

Figure 16:
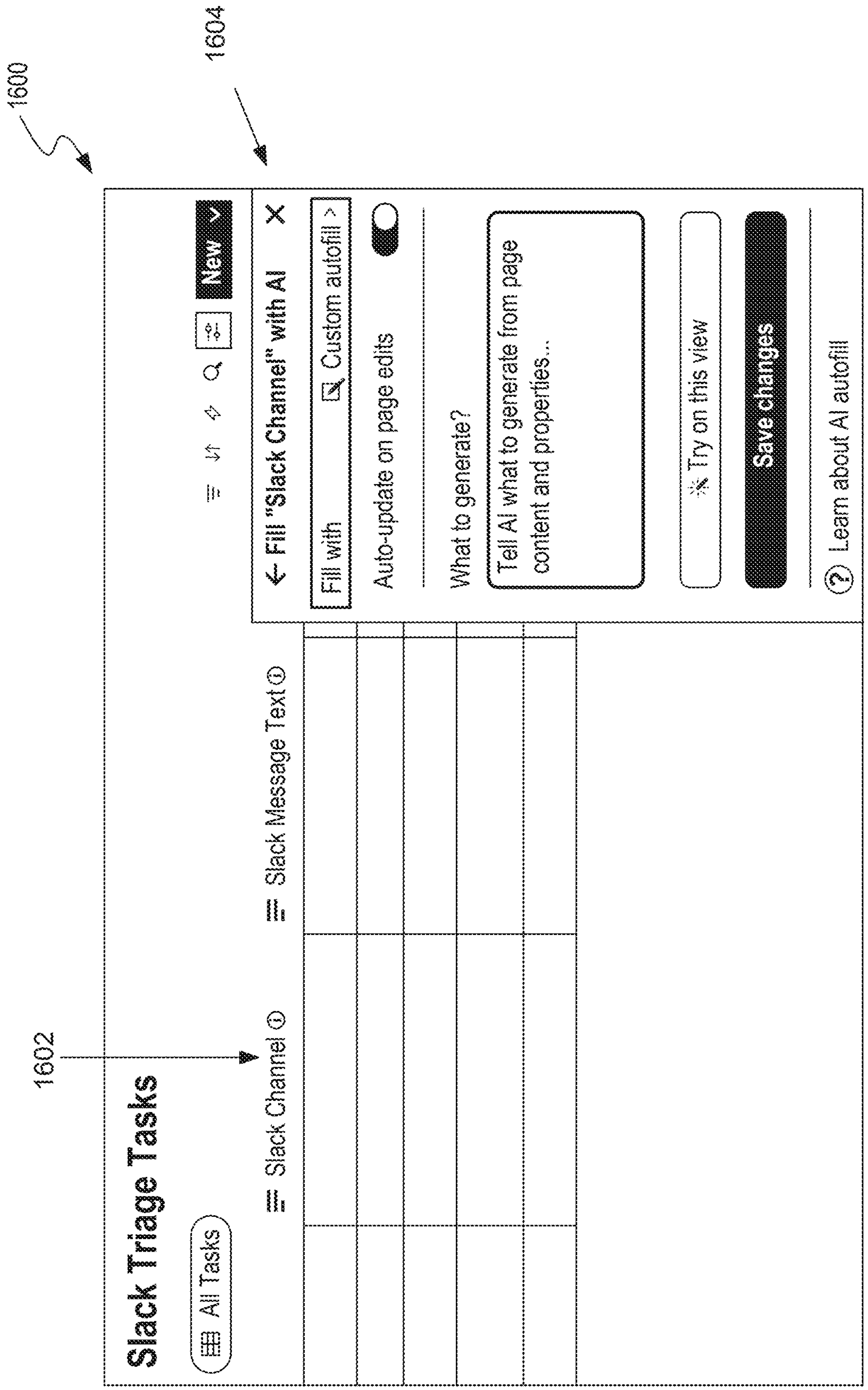
FIG. 16 is an example of a database in which an AI agent is added to a row within an agent column of the database.

FIG. 16 is an example of a database 1600 in which an AI agent is added to a row within an agent column 1602 of the database 1600. The AI agent may be the same as or similar to AI agent 408 discussed in relation to FIG. 4. In some embodiments, an indication to add the AI agent to the row within the agent column 1602 is received from a user. For example, the indication to add the AI agent to the row may be received via a communication channel between the user and a second AI agent. The user may be the same as or similar to the user 402 as discussed in relation to FIG. 4 above.

In some embodiments, the communication channel is an input field, which may be the same as or similar to the input field 502 of FIG. 5. In some embodiments, in response to an indication received from the user, via a dedicated AI agent fill interface 1604, to add the AI agent to a row, the AI agent is added to the row within an agent column 1602 of a database 1600. Each entry in the agent column 1602 may include one or more AI agents. In some embodiments, including the AI agent in the agent column constrains the AI agent to perform actions that consist of modifying particular entries in the database that are included in the row. Constraining the AI agent in this way may conserve computational resources, as the AI agent only processes data within the row while performing actions rather than processing a larger corpus of data that may be searched/operated on were the AI agent not constrained.

In such embodiments, the AI agent may be configured to have a set of instructions including a particular modification to the database 1600 as a trigger and one or more actions to perform within the row of the database 1600 in response to the trigger. For example, the set of instructions may include instructions to summarize an input, such as text, in the agent column of the row containing the AI agent and/or perform a calculation using a numerical input. Thus, in response to an occurrence of this trigger, the particular modification may be provided to the AI agent as input and the AI agent may be directed to execute the set of instructions that the AI agent is configured to have, thereby causing a modification to a particular entry in the row of the database 1600.

In some embodiments, the AI agent is configured to be associated with a set of instructions and a set of integrations. The set of instructions may be provided by the user via an input field, which may be the same as or similar to the input field 502 of FIG. 5, during a communication session with a second AI agent. The user may configure the AI agent as a custom agent by customizing the set of instructions and/or the set of integrations via the AI agent fill interface 1604 by, for example, providing input to the AI agent regarding what content to generate in response to a trigger. A custom agent is an AI agent that is configured, by the user, another user, and/or by a different AI agent, to perform a particular task/function within the workspace application.

In some embodiments, the AI agent executes its set of instructions by first determining a semantic meaning of the particular modification included in the set of instructions. The semantic meaning may then be compared to one or more descriptions associated with one or more tools from the set of tools. Further, based on the comparison, a list of usable tools from the set of tools may be determined, where the tools from the list of usable tools are executed in order to cause the modification to a particular entry in the row of the database 1600. In such embodiments, based on the list of usable tools and the determined semantic meaning, a first plan may be generated including a second set of instructions for executing one or more tools from the list of usable tools in a predetermined order to cause the modification to the particular entry and one or more instructions from the second set of instructions may be executed.

In some embodiments, the AI agent causes the modification to the particular entry in the row by performing an integration from the set of integrations. Performing the integration may include executing one or more tools from the set of tools based on the set of access permissions and the associated descriptions of the one or more tools. The set of tools may include at least one of a page creation tool, a page update tool, a page deletion tool, a database creation tool, a database update tool, a database deletion tool, or a database query tool.

In some embodiments, the AI agent is a lightweight agent configured to invoke an AI model requiring limited processing power to operate (e.g., on the order of a one-shot or few-shot model rather than an LLM). In such an embodiment, the set of tools associated with the AI agent is a subset of tools available within the workspace application. The subset of tools may include fewer tools than the entire set of tools available to AI agents within the workspace application. For example, the subset may exclude tools that would require a high amount of processing power incompatible with a lightweight agent. In some embodiments, each tool within the subset of tools, when executed, performs a lightweight operation for database row modification. A lightweight operation may be a modified version of a standard database row modification used within a workspace application (e.g., an operation limited to reading, writing, and/or modifying data in the row) that has more limited capabilities but results in a similar output while requiring less computational resources to perform. In such embodiments, the lightweight AI agent can only access data within the row that the AI agent resides in. This further limits the amount of data that the AI agent can access when executing the set of instructions, which may allow the AI agent to perform tasks quickly while expending limited computational resources in the process. The use of a lightweight agent for tasks such as database row modification may provide computational efficiency benefits, as the computational resource expenditures of a lightweight agent are limited in one or more of the ways described above, but the capabilities of the lightweight agent are still robust enough to perform database row modification.

Figure 17:
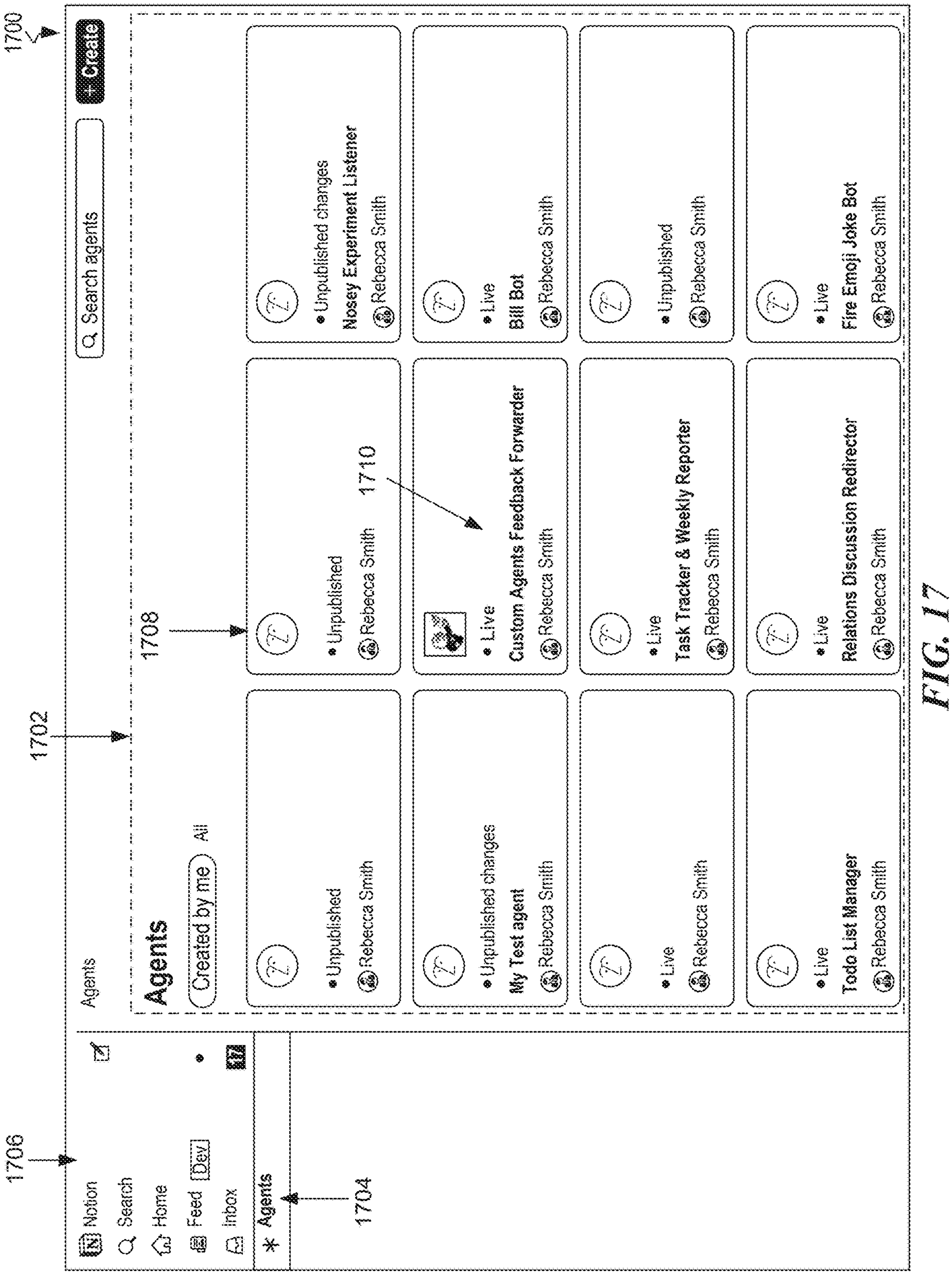
FIG. 17 shows an embodiment of a UI representation of an AI agent data store.

FIG. 17 shows an embodiment of a UI representation 1700 of an AI agent data store 1702. In some embodiments, a user is able to access the AI agent data store 1702 by selecting an AI agent data store selection icon 1704. The user may be the same as or similar to the user 402 discussed in relation to FIG. 4. In some embodiments, the AI agent data store selection icon 1704 is housed in a sidebar 1706 of the UI representation 1700. The workspace application may be the same as or similar to workspace application 404 as discussed in relation to FIG. 4. In some embodiments, the AI agent is added to the AI agent data store 1702, wherein one or more AI agents included in the AI agent data store 1702 are displayed within the UI representation 1700.

In some embodiments, the list of viewable AI agents within the AI agent data store 1702 includes only AI agents that are created by and/or accessible by a particular user. In other embodiments, the list of viewable AI agents within the AI agent data store 1702 includes AI agents that are accessible to any user having access to a particular workspace. In some embodiments, the user will select one of the AI agents included in the AI agent data store 1702 (e.g., by clicking on an icon 1708 of the AI agent, as described below, using a mouse cursor) to perform a particular task for the user. In such embodiments, an indication may be received from the user via the UI representation 1700 to add the AI agent to the row. In some embodiments, the user may provide the indication to add the AI agent to the row via an input field, which may be the same as or similar to the input field 502 as discussed in relation to FIG. 5.

In some embodiments, the AI agents stored as part of the AI agent data store 1702 are represented via an icon 1708 and a name 1710 displayed to the user. In some embodiments, the AI agent is a custom agent and the user customizes the icon 1708 and/or name 1710 associated with the AI agent to represent the function/task of that custom agent. For example, the user may specify an icon 1708 and/or name 1710 for the AI agent when defining the task for the AI agent to complete (e.g., via the input field). In some embodiments, the user may change or add an associated icon 1708 and/or name 1710 after creating the AI agent. In some embodiments, the user can change or add the associated icon 1708 and/or name 1710 via the UI representation 1700. In some embodiments, the user can change or add the associated icon 1708 and/or name 1710 by selecting (e.g., using a mouse cursor) the AI agent via the UI representation 1700 and choosing to alter the display settings of the AI agent.

Example Defining and Calling AI Agent Method Flow

Figure 18:
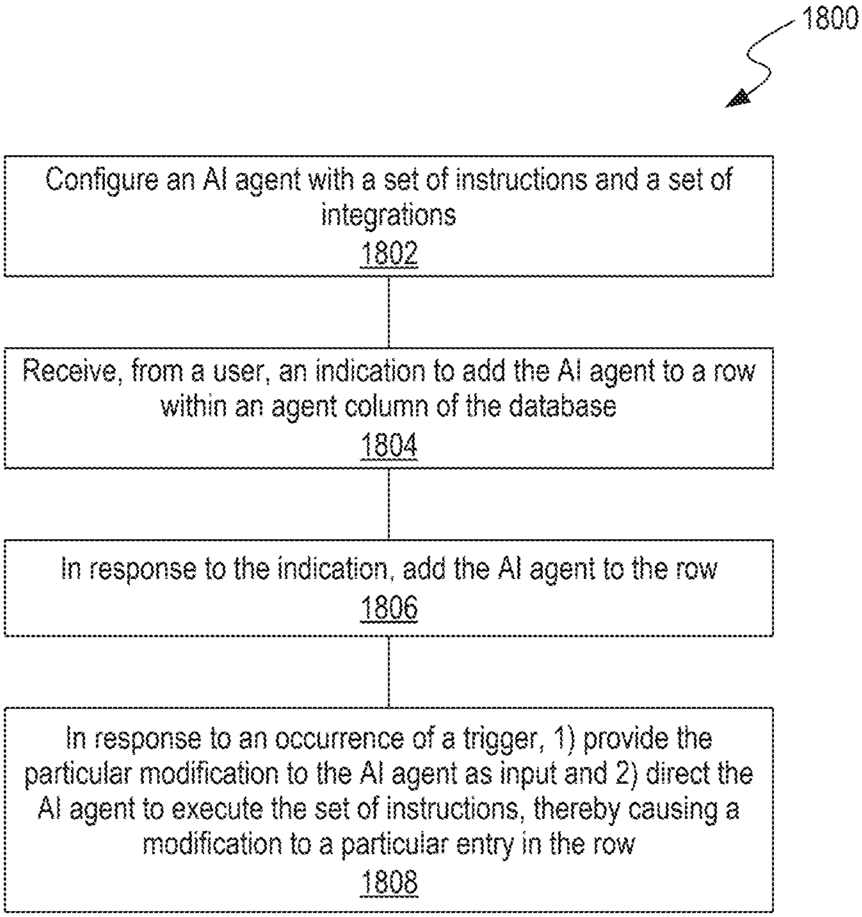
FIG. 18 is a flow diagram illustrating an example method of configuring an AI agent and adding an AI agent to a database to complete a user-requested task in response to a trigger.

FIG. 18 is a flow diagram illustrating an example method 1800 of configuring an AI agent and adding an AI agent to a database to complete a user-requested task in response to a trigger. The user and the AI agent may be the same as or similar to the user 402 and the AI agent 408 as discussed in relation to FIG. 4, respectively. In some embodiments, the method 1800 is performed by components of the example computer system illustrated and described in more detail in relation to FIG. 25 below and/or the workspace application 404 described in relation to FIG. 4 above. Likewise, embodiments can include different and/or additional operations or can perform the operations in different orders.

In operation 1802, an AI agent is configured with a set of instructions and a set of integrations. In some embodiments, the set of instructions describes one or more actions for the AI agent to perform upon occurrence of a trigger. The trigger may be a particular modification to a row of a database. In some embodiments, each integration in the set of integrations includes a set of access permissions for the AI agent and a set of tools executable by the AI agent. In some embodiments, each tool from the set of tools, when executed, performs a particular function within a workspace application. Each tool from the set of tools may be associated with a description of the particular function performed when the tool is executed. The integration and the set of access permissions may be the same as or similar to the integration 1004 and the set of access permissions 1002 as discussed in relation to FIG. 10, respectively.

In operation 1804, an indication to add the AI agent to the row within an agent column of the database is received from the user. In some embodiments, each entry in the agent column of the database includes one or more AI agents. In some embodiments, including the AI agent in the agent column constrains the AI agent to modifying particular entries in the database that are included in the row. Constraining the AI agent to modifying particular entries in the database that are included in the row may provide benefits in the form of enhanced computational efficiency because the AI agent has a minimal amount of data or information to parse through when executing a tool and only has to access the specific row entry that the AI agent is instructed to modify.

In operation 1806, the AI agent is added to the row in response to the indication from the user. As discussed in relation to FIG. 15 and FIG. 16, the indication by the user to add the AI agent to the row may be received via an input field or an AI agent fill interface. In operation 1808, in response to an occurrence of the trigger, the particular modification is provided to the AI agent as input and the AI agent is directed to execute the set of instructions, thereby causing a modification to a particular entry in the row.

Agent Automations and Triggers

Figure 19:
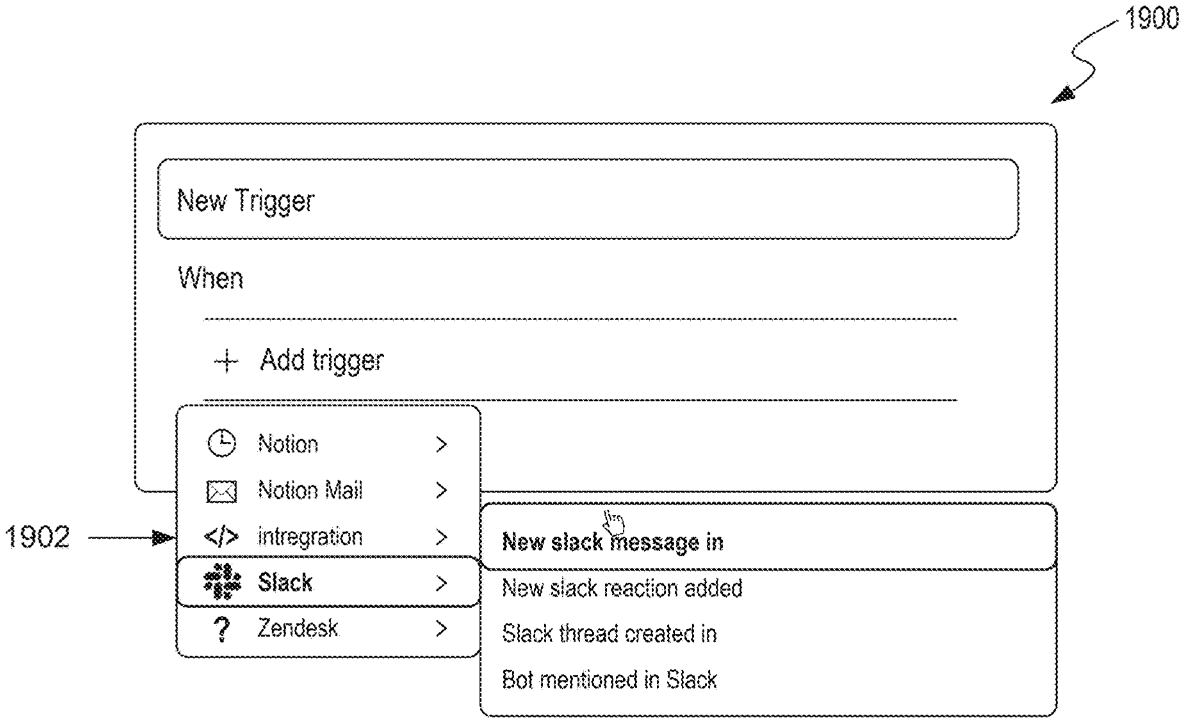
FIG. 19 shows an example of an AI agent trigger configuration interface used to configure one or more triggers for a workspace application.

FIG. 19 shows an example of an AI agent trigger configuration interface 1900 used to configure one or more triggers for a workspace application (e.g., the workspace application described in relation to FIG. 4 above). A trigger is an event that, upon occurrence, automatically initiates a call of a first AI agent within the workspace application. The call of the first AI agent may cause the first AI agent to execute a first set of instructions, including an instruction to execute a tool for modifying a database within the workspace application. The first AI agent may be the same as or generally similar to the AI agent 408 discussed in relation to FIG. 4 above. In some embodiments, the first AI agent is an AI agent that invokes a lightweight model (e.g., a computationally inexpensive model) to produce an output that is later processed by other AI agents using more computationally intensive models. In such embodiments, the first AI agent may improve computational efficiency of the workspace application, as a lightweight model may be used to pre-filter/pre-process certain inputs, reducing the amount of processing performed by more computationally intensive models.

In some embodiments, a user (e.g., the user 402 described in relation to FIG. 4 above) configures the trigger via a trigger selection menu 1902 included in the AI agent trigger configuration interface 1900. In some embodiments, the trigger selection menu 1902 contains various platforms for the user to select as the location of the trigger as well as an embedded menu to select a trigger from a list of possible triggering events. The trigger may be an action performed within the workspace application, a third-party application, and/or any combination of a plurality of applications. For example, the user may choose to configure the automation to contain a trigger originating from an event that occurs within the workspace application (e.g., Notion®) or within a third-party application, such as Slack® or Zendesk®. In an example, the user selects, from the trigger selection menu 1902, a particular third-party application as the location of the trigger that may cause the AI agent to execute the first set of instructions. Further, the triggering event may be, for example, a new message, a new reaction, a creation of a thread, or a mention of the first AI agent within the particular third-party application. The location of the trigger may be any third-party application that is able to interface with the workspace application and/or the trigger may be an event that occurs within the workspace application itself. Particular non-limiting examples of triggers include emoji reactions, text messages, thread creation, mentions by a user or other AI agent, or creation or editing of a support ticket.

Figure 20:
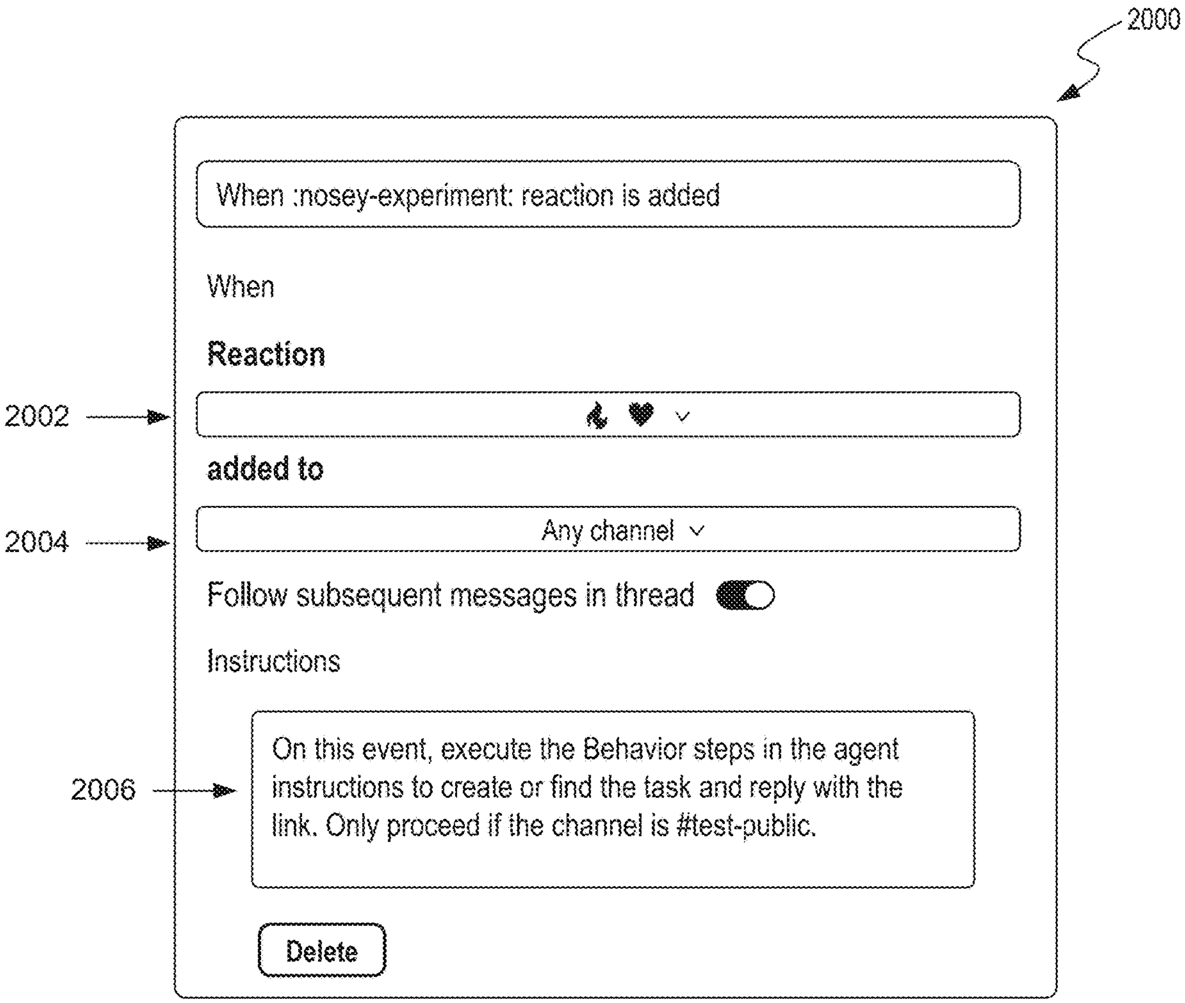
FIG. 20 shows another example of an AI agent trigger configuration interface.

FIG. 20 shows another example of an AI agent automation configuration interface 2000. An automation includes a trigger that automatically initiates a call of an AI agent, in turn causing the AI agent to execute a set of instructions associated with the AI agent. The set of instructions may include an instruction to execute a tool for modifying a database within a workspace application (e.g., the workspace application 404 described in relation to FIG. 4 above). In some embodiments, a user configures specific automation parameters for an automation for a first AI agent via the AI agent automation configuration interface 2000. The user and the first AI agent may be the same as or similar to the user 402 and the AI agent 408 discussed in relation to FIG. 4 above. In some embodiments, an occurrence of a trigger is detected, and in response, the first AI agent is called and provided with context associated with the trigger. The context can include the trigger itself, a message associated with the trigger (e.g., a message to which an emoji reaction trigger is applied, a message in a communication channel including the trigger), an identity of a user who caused the trigger, the location of the trigger, instructions for the first AI agent to execute in response to the trigger, and/or other information related to the trigger. Additionally or alternatively, information regarding the current state of the workspace application or third-party application, user integrations and permissions, and other information relevant to the first AI agent may be provided as context associated with the trigger. Detecting an occurrence of the trigger may result in the activation of an automation, which may further result in a call to a first AI agent to complete a first set of instructions.

In an example, the user chooses the platform on which the trigger occurs to be a third-party application. The user is then able to select the trigger, which may be, for example, an emoji reaction. The user, via the trigger event selection menu 2002, may then select the specific emoji reaction(s) that results in a call to the first AI agent. Further, the user may then select a specific trigger location via a trigger location selection menu 2004. In the example, the user may select “any channel,” which corresponds to any communication channel within the third-party application as the location of the trigger that results in a call to the AI agent upon occurrence of the trigger. However, the user may alternatively select a specific communication channel (e.g., a channel that the user has access to) as the trigger location. The discussion herein of a communication channel in a third-party application is non-limiting and simply serves as an example implementation of trigger event selection and automation configuration. Further, in the illustrated embodiment, the user may specify a set of instructions via an automation instruction input interface 2006 for the AI agent to execute upon activation of the automation as a result of the triggering event. In some embodiments, the instructions provided to the first AI agent within the automation instruction input interface 2006 refer to execution of a separate set of instructions associated with the AI agent.

In some embodiments, the automation is further configured (e.g., by the user) to include an integration. The integration may be the same as or similar to the integration 1004 as discussed in relation to FIG. 10. In some embodiments, the integration includes a set of access permissions for the first AI agent and a set of tools executable by the first AI agent. Further, the set of access permissions may be based on an access permission of the user. The set of access permissions for the first AI agent may be the same as or similar to the set of access permissions 1002 discussed in relation to FIG. 10. The set of tools may include the tool for modifying the database and/or a tool for interacting with the third-party application. Including the integration in the automation enables the first AI agent to follow the integration as a heuristic while performing various actions (e.g., while responding to prompts received from the user).

In some embodiments, upon detecting an occurrence of the trigger, the first AI agent is called and is provided with the context associated with the trigger. In some embodiments, an output resulting from execution of the first set of instructions by the first AI agent is received from the first AI agent. In some embodiments, the output includes a modification to a database. Causing a modification to a database is not a limiting example; the first AI agent may be able to perform any action within the workspace application that is able to be performed with the tools available to the first AI agent (e.g., tools stored within a tools data store) to provide an output to the user.

In some embodiments where the first AI agent generates an output to the user, the first AI agent may first determine a semantic meaning of the context associated with the trigger. In such embodiments, the first AI agent may then compare the semantic meaning to one or more descriptions associated with one or more tools from a set of tools. The set of tools may be associated with the tools data store 410 discussed in relation to FIG. 4 above. The first AI agent may then determine a list of usable tools from the set of tools in order to generate the output (e.g., to cause a modification to a database). In an example in which the output is a modification to a database, based on the list of usable tools and the semantic meaning as determined by the first AI agent, a first plan is generated, including a second set of instructions for executing one or more tools from the list of usable tools in a predetermined order to cause the modification to the database. One or more instructions from the second set of instructions may then be executed (e.g., by the first AI agent or another component of the workspace application).

In some embodiments, a second AI agent is directed to determine whether the output of the first AI agent is a successful execution of the first set of instructions. In such embodiments, the second AI agent generates an indication of whether the output is a successful execution of the first set of instructions. When the second AI agent generates an indication that the output is a successful execution of the first set of instructions, the output may be caused to be displayed via a UI. The UI may be the same as or similar to the UI 416 as discussed in relation to FIG. 4. The second AI agent may be a multi-turn agent that executes multiple instructions using a same context and may consume more computational resources than the first AI agent, thereby enabling the second AI agent to perform more complex processing.

In embodiments where the second AI agent generates an indication that the output is not a successful execution of the first set of instructions, a notification of unsuccessful execution may be caused to be displayed via a UI. Upon receiving the indication from the second AI agent that the output is an unsuccessful execution of the first set of instructions, the second AI agent may be directed to generate a solution proposal for remedying the unsuccessful execution of the first set of instructions. The solution proposal may be associated with a third set of instructions and may be displayed via a UI. In an embodiment, an approval of the solution proposal is received from a user via the UI and at least one of the first AI agent or the second AI agent is directed to execute the third set of instructions.

Figure 21:
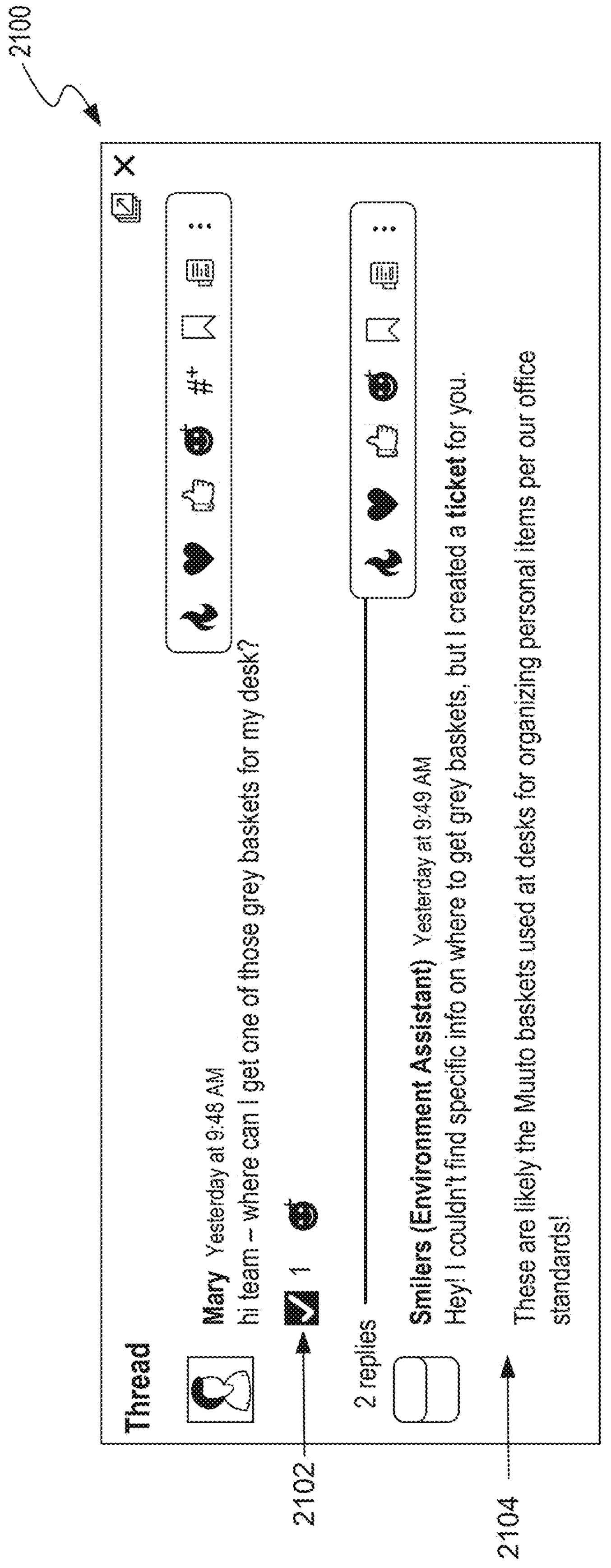
FIG. 21 illustrates an example of a third-party application communication interface in which an AI agent observes a trigger and, as a result, executes a set of instructions.

FIG. 21 illustrates an example of a third-party application communication interface 2100 in which an AI agent observes a trigger 2102 and, as a result, executes a set of instructions. In the illustrated embodiment, the trigger 2102 is an emoji reaction (e.g., of the checkmark emoji) to a user message in the third-party application communication interface 2100. As discussed above, the trigger is not limited to an emoji reaction and may include a text message, a thread creation, a user or AI agent mention, or a support ticket, among other observable events within the workspace application or third-party application. In some embodiments, the set of instructions causes the AI agent to, upon observing the occurrence of the trigger, generate a reply 2104 to a user message via the third-party application communication interface 2100. Further, in some embodiments, the set of instructions causes the AI agent to perform an action within the workspace application. In an example, the AI agent creates a support ticket within the workspace application for a future follow-up communication with the user.

Example AI Agent Automation Method Flow

Figure 22:
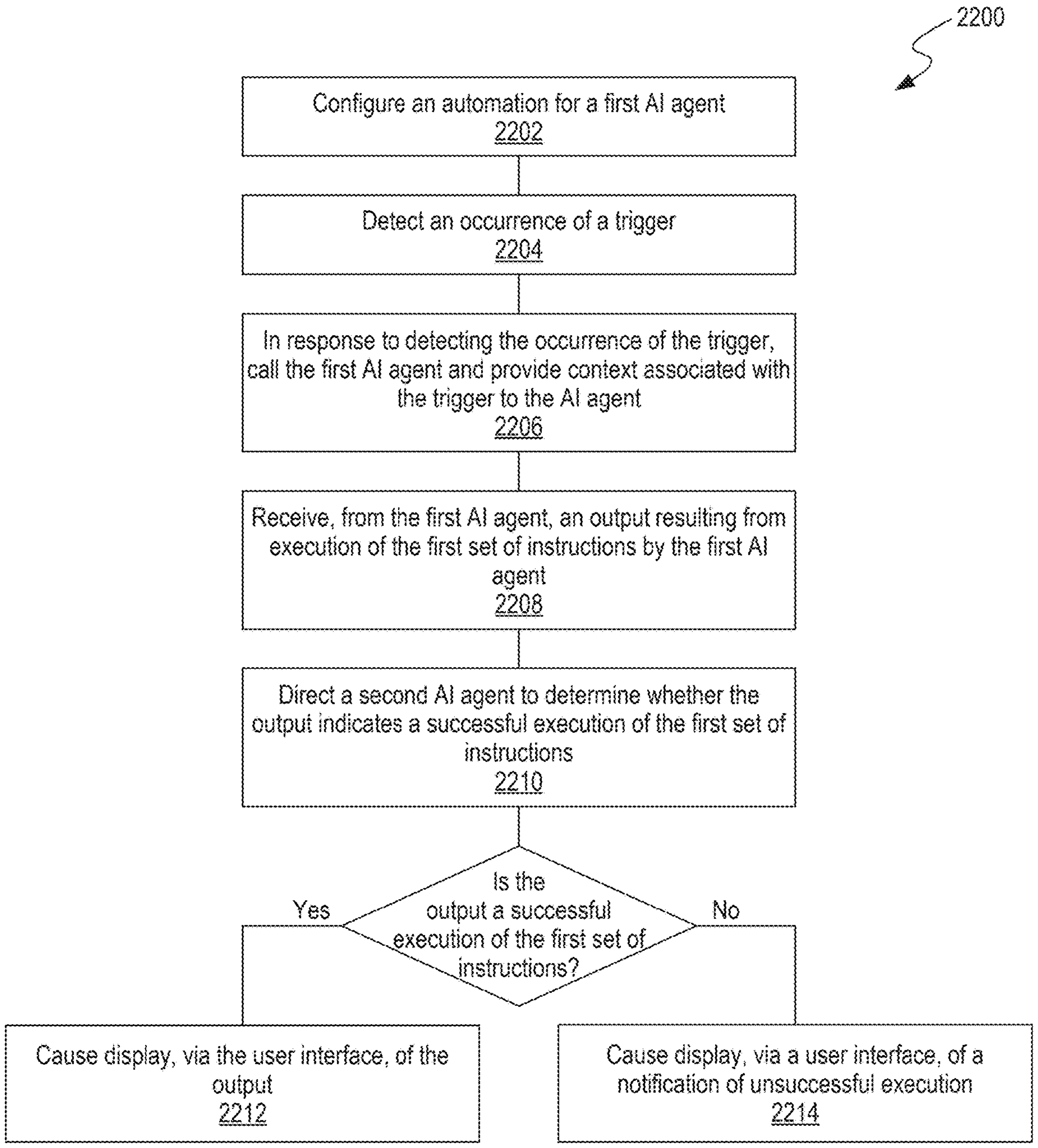
FIG. 22 is a flow diagram illustrating an example method of configuring a first AI agent with an automation to respond to a trigger.

FIG. 22 is a flow diagram illustrating an example method 2200 of configuring a first AI agent with an automation to respond to a trigger. In some embodiments the first AI agent is the same as or similar to AI agent 408 as discussed in relation to FIG. 4. In some embodiments, the method 2200 is performed by components of the example computer system illustrated and described in more detail in relation to FIG. 25 below and/or the workspace application 404 described in relation to FIG. 4 above. Likewise, embodiments can include different and/or additional operations or can perform the operations in different orders.

In operation 2202, an automation is configured for a first AI agent. In some embodiments, the automation includes a trigger that automatically initiates a call of the first AI agent. Calling the first AI agent may cause the first AI agent to execute a first set of instructions, which may include an instruction to execute a tool for modifying a database within a workspace application. The first AI agent and the workspace application may be the same as or similar to the AI agent 408 and the workspace application 404 as discussed in relation to FIG. 4. In some embodiments, the trigger is an action performed either within the workspace application or a third-party application.

In operation 2204, an occurrence of the trigger is detected. In some embodiments, the occurrence of the trigger is detected by the first AI agent. In operation 2206, the first AI agent is called in response to detecting the occurrence of the trigger and context associated with the trigger is provided to the AI agent. In some embodiments, the context associated with the trigger includes the location of the trigger (e.g., within the workspace application or within a third-party application), the triggering event, and instructions for the AI agent to execute as a result of the occurrence of the trigger. In other embodiments, a determination is made to respond to the trigger using deterministic execution and a script is executed in response to the trigger instead of calling the first AI agent. Deterministic execution and scripts are described in more detail in relation to FIG. 23 below. In operation 2208, an output resulting from the execution of the first set of instructions by the first AI agent is received from the first AI agent. In some embodiments, the output includes a modification to a database.

In operation 2210, a second AI agent is directed to determine whether the output indicates a successful execution of the first set of instructions. The second AI agent may be a separate AI agent from the first AI agent or may be the same AI agent performing this determination. Depending on the determination made by the second AI agent, the method 2200 proceeds in different ways. In other embodiments where the first AI agent indicates a high confidence in the output being a successful execution of the first set of instructions, operation 2210 may be skipped so that additional resources are not spent on verifying success when the probability of success is already high.

Operation 2212 reflects the alternative where an indication is received, from the second AI agent, that the first output is a successful execution of the first set of instructions. In operation 2212, display is caused, via the UI, of the output to the user. The UI may be the same as or generally similar to the UI 416 as described in relation to FIG. 4 above.

Operation 2214 reflects the alternative in which an indication is received, from the second AI agent, that the output is not a successful execution of the first set of instructions. In operation 2214, display is caused, via a UI, of a notification of unsuccessful execution. In some embodiments, upon receiving the indication from the second AI agent that the output is an unsuccessful execution of the first set of instructions, the second AI agent is directed to generate a solution proposal for remedying the unsuccessful execution of the first set of instructions. In some embodiments, the solution proposal is associated with a second set of instructions. In such embodiments, the solution proposal may be displayed via the UI and approval of the solution proposal may be received from the user via the UI. At least one of the first AI agent or second AI agent may then be directed to execute the second set of instructions.

Agents and Scripts

Figure 23:
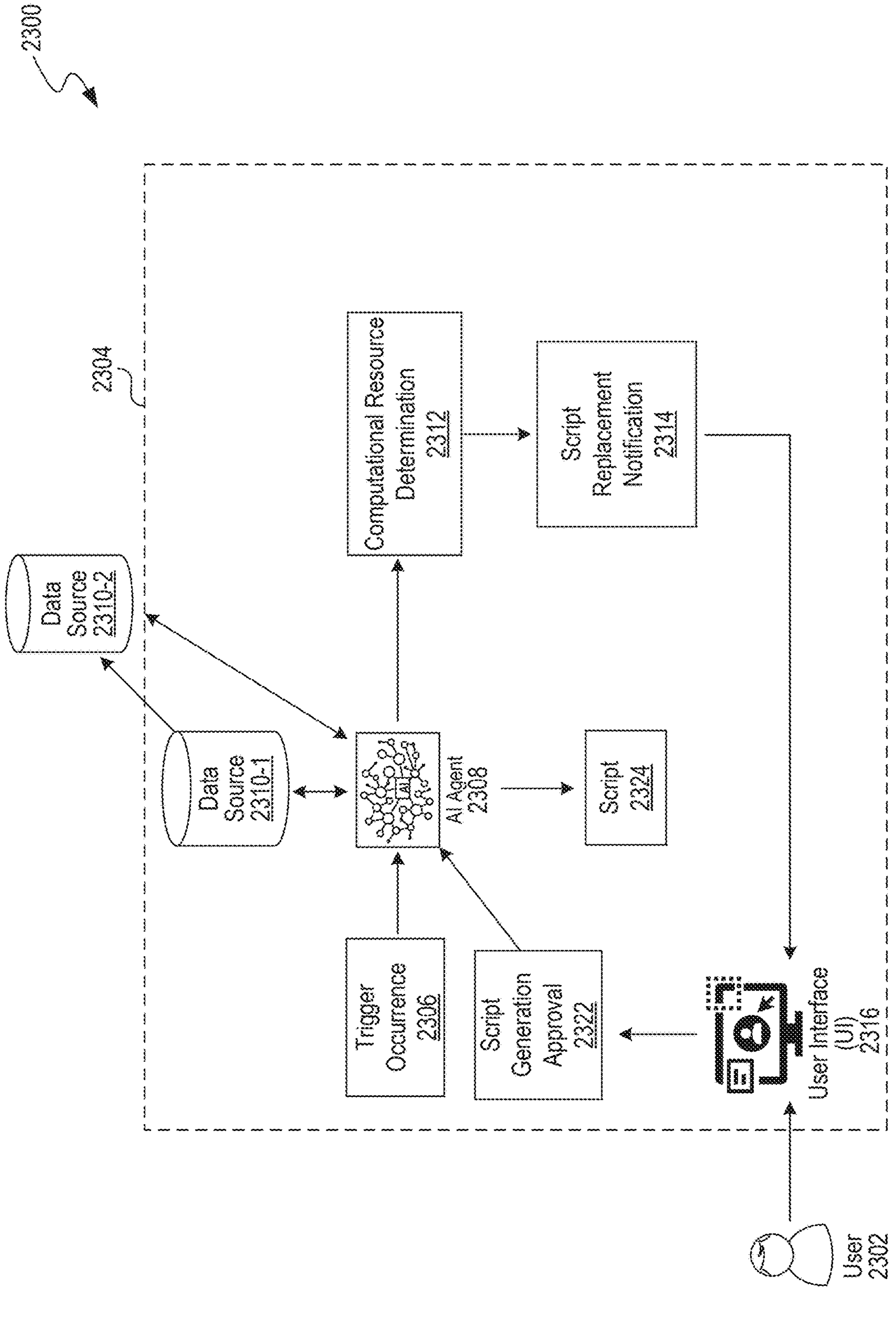
FIG. 23 illustrates a second example workspace environment including an AI agent in which an occurrence of a trigger within a workspace application causes a script to replace the AI agent as the target of the trigger.

FIG. 23 illustrates a second example workspace environment 2300 including an AI agent 2308 in which an occurrence of a trigger within a workspace application 2304 causes a script to replace the AI agent 2308 as the target of the trigger. The AI agent 2308 and the workspace application 2304 may be the same as or similar to the AI agent 408 and the workspace application 404, as discussed in relation to FIG. 4 above, respectively. The workspace environment 2300 may be implemented using components of the example computer system illustrated and described in more detail with reference to FIG. 25 below. Likewise, implementations of the example workspace environment 2300 can include different and/or additional components or can be connected in different ways.

The AI agent 2308 may be configured or assigned as a target of a trigger. The trigger may be the same as or similar to the trigger 2102 discussed in relation to FIG. 21 above. In some embodiments, the trigger is an action performed within one of either the workspace application or a third-party application that automatically initiates a call of the target of the trigger. In embodiments where the AI agent 2308 is assigned as the target of the call of the trigger, a trigger occurrence 2306 results in a call of the AI agent 2308. The call of the AI agent 2308 may cause the AI agent 2308 to perform an analysis of a set of instructions (e.g., by applying one or more AI models to the set of instructions). The set of instructions may be associated with the trigger or an automation, as discussed in relation to FIG. 19 and FIG. 20, or the set of instructions may be associated with the AI agent 2308. In some embodiments, in response to the trigger occurrence, the AI agent 2308 is provided with context associated with the trigger. The context may be the same as or generally similar to the context described in relation to FIG. 20 above.

In the illustrated embodiment, the AI agent 2308 generates a computational resources determination 2312 in response to being called. The computational resources determination 2312 is a determination that the set of instructions is appropriate for deterministic execution. In some embodiments, this determination is based on a prediction, by the AI agent 2308, that deterministically executing the set of instructions uses fewer computational resources than executing the set of instructions using the AI agent 2308, which may result in varying outputs depending on the generative outputs of one or more AI models invoked by the AI agent 2308. For example, the prediction may be made by the AI agent 2308 by applying one or more AI models to the set of instructions and/or the context to generate an output indicative of an amount of computational resources that executing the set of instructions would expend.

Deterministic execution may differ from execution using the AI agent 2308 in that deterministic execution of a set of instructions is expected to always produce an identical output for a given input. Deterministic execution may be preferred for tasks that are intended to produce the same output for a given input, as variance will not be introduced by generative processes of an AI agent. Furthermore, deterministic execution may require fewer computational resources to execute a given set of instructions than the AI agent 2308, which may invoke a computationally expensive AI model, and therefore improve computational efficiency of the workspace environment 2300.

In the illustrated embodiment, the computational resources determination 2312 triggers a user 2302 to be provided, via a UI 2316, with a script replacement notification 2314. The script replacement notification may be a notification for the user 2302 to approve replacing the AI agent with a script 2324 as the target of the trigger. The user 2302 and the UI 2316 may be the same as or similar to the user 402 and the UI 416 discussed in relation to FIG. 4 above, respectively. In some embodiments the script 2324 is a deterministic code segment that, when called, executes the set of instructions to generate an output.

In some embodiments, a script generation approval 2322 is received from the user 2302 via the UI 2316. The script generation approval 2322 is an approval, by the user 2302, of the computational resources determination 2312 received in response to the script replacement notification 2314. In response to receiving the script generation approval 2322 from the user 2302, a script 2324 is generated, and the AI agent 2308 is replaced by the script 2324 as the target of the trigger. As depicted in FIG. 23, the script 2324 is generated by the AI agent 2308 based on an analysis of the set of instructions. In some embodiments, the analysis of the set of instructions causes the AI agent 2308 to extract information from one or more data sources 2310. The one or more data sources may be the same as or similar to the one or more data sources 420 discussed in relation to FIG. 4. For example, the AI agent 2308 may access a first data source 2310-1 that is a connected data source included in the workspace application 2304 (e.g., as a page, database, or other block) and that includes data that is semantically similar and/or relevant to executing the set of instructions (e.g., as determined by a language model invoked by the AI agent 2308). Continuing with the same example, the AI agent may access a second data source 2310-2 that is a source of data from outside the workspace application 2304, such as a third-party application (e.g., an application operated by an entity other than the operator of the workspace application 2304), a web source (e.g., a website on the Internet), or a second AI agent that is generally similar to the AI agent 2308 but is not hosted within the workspace application 2304.

In some embodiments, a second trigger occurrence is detected, which may be a repeated instance of the trigger occurrence 2306. In response to detecting a second trigger occurrence, the script 2324 may be called, and an output may be generated as a result. In some embodiments, a second AI agent is directed to determine whether the output indicates a successful execution of the set of instructions. The second AI agent may be a separate AI agent from the first AI agent or may be the same AI agent performing this determination. In some embodiments, an indication is received from the second AI agent that the output is an unsuccessful execution of the set of instructions. As a result of the indication received from the second AI agent, the second AI agent may proceed in multiple ways. In some embodiments, the second AI agent is directed to execute a remaining one or more instructions from the set of instructions. In other embodiments, the second AI agent is directed to modify the script 2324 and call the modified script to execute the remaining one or more instructions.

In some embodiments in which a second trigger occurrence is detected, the script 2324 is called. Calling the script 2324 may result in the execution of one or more tools from the set of tools, which may be stored in tools data store 410, as discussed in relation to FIG. 4. Each tool from the set of tools, when executed, performs a particular function within the workspace application.

In an example of an embodiment in which a second trigger occurrence is detected, in response to detecting the second trigger occurrence, the script 2324 is called. Continuing the example, calling the script 2324 activates an AI sub-agent to generate an output by executing the set of instructions. The AI sub-agent may be the same as or similar to the AI sub-agent 1304 as discussed in relation to FIG. 13. In some embodiments, the AI agent 2308 is associated with a first set of tools. Each tool from the first set of tools, when executed, performs a particular function within the workspace application 2304. The set of tools may be stored in the tools data store 410, discussed in relation to FIG. 4 above. Additionally or alternatively, the AI sub-agent may be associated with a second set of tools, including a specialized tool (e.g., a tool associated with a particular task the AI sub-agent is configured to complete) that is not included in the first set of tools. In some embodiments, the AI sub-agent is activated by the AI agent performing an integration. The integration may include a set of access permissions for the first AI agent and the first set of tools. The integration may be the same as or similar to integration 1004, as discussed in relation to FIG. 10.

Example AI Agent Script Generation and Execution Method Flow

Figure 24:
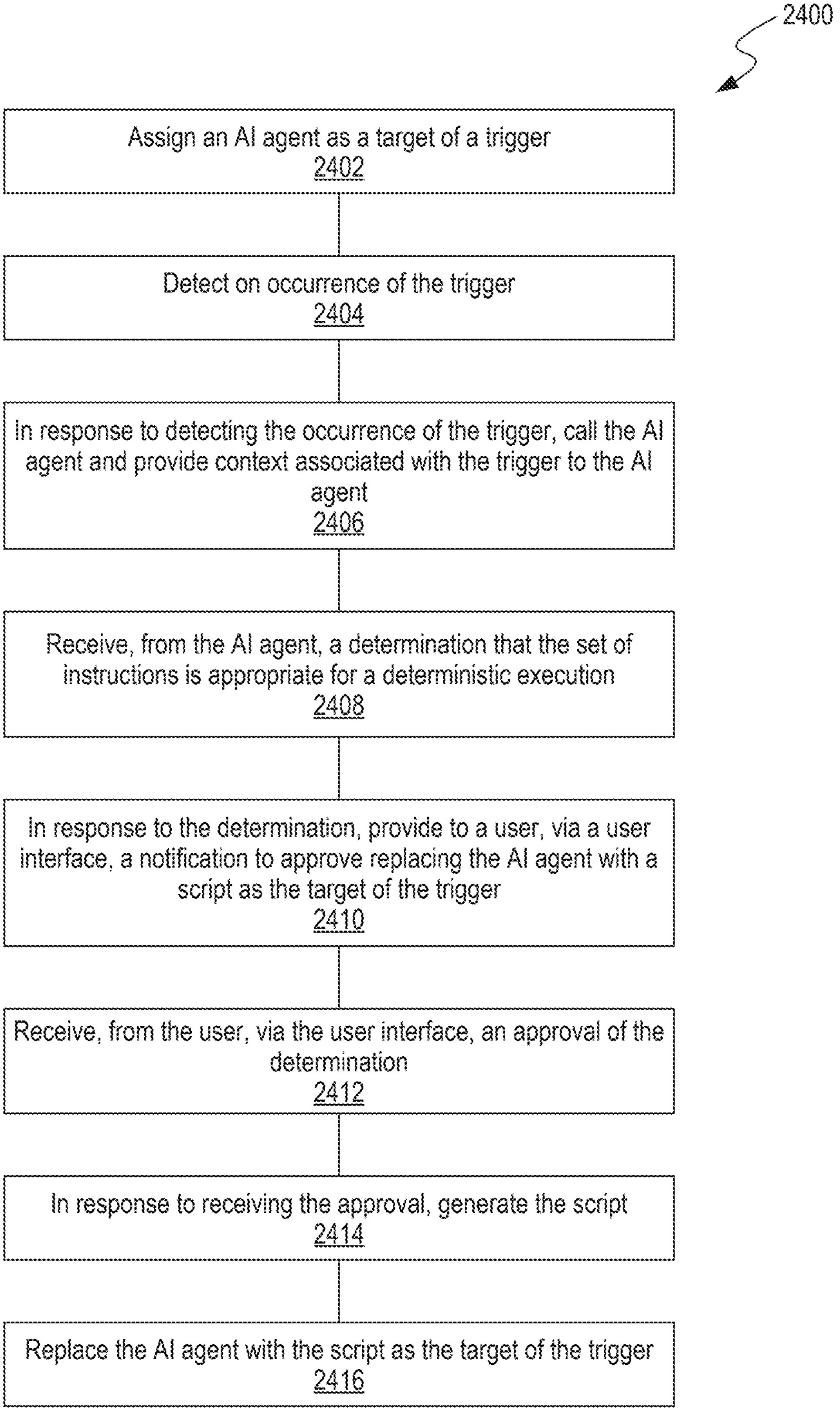
FIG. 24 is a flow diagram illustrating an example method of replacing an AI agent with a script as the target of a trigger.

FIG. 24 is a flow diagram illustrating an example method 2400 of replacing an AI agent with a script as the target of a trigger. In some embodiments, the method 2400 is performed by components of the example computer system illustrated and described in more detail in relation to FIG. 25 below and/or the workspace application 2304 described in relation to FIG. 23 above. Likewise, embodiments can include different and/or additional operations or can perform the operations in different orders.

In operation 2402, an AI agent is assigned as a target of a trigger. The trigger may be the same as or similar to the trigger 2102 as discussed in relation to FIG. 21 above. In some embodiments, the trigger is an action performed within either a workspace application or a third-party application that automatically initiates a call of the target of the trigger. Calling the AI agent may cause the AI agent to perform an analysis of a set of instructions. The AI agent may be the same as the AI agent 408 or the AI agent 2308 as discussed in relation to FIG. 4 and FIG. 23, respectively. The workspace application may be the same as or similar to the workspace application 404 or the workspace application 2304 as discussed in relation to FIG. 4 and FIG. 23, respectively.

In operation 2404, an occurrence of the trigger is detected. In operation 2406, in response to detecting the occurrence of the trigger, the AI agent is called and provided with context associated with the trigger. In some embodiments, the context associated with the trigger includes the location of the trigger (e.g., within the workspace application or within a third-party application), the triggering event, and/or instructions for the AI agent to execute. Information regarding the current state of the workspace application or third-party application, user integrations and permissions, and other information relevant to the AI agent may also be provided as context associated with the trigger.

In operation 2408, a determination that the set of instructions is appropriate for deterministic execution is received from the AI agent. The determination by the AI agent that the set of instructions is appropriate for deterministic execution is discussed in relation to the computational resources determination 2312 of FIG. 23. The determination may be based on a prediction, by the AI agent, that executing the set of instructions deterministically uses fewer computational resources than executing the set of instructions using the AI agent.

In operation 2410, in response to the determination, a notification to approve replacing the AI agent with a script as the target of the trigger is provided to a user via a UI. The user may be the same as or similar to the user 402 or the user 2302 as discussed in relation to FIG. 4 and FIG. 23, respectively. In some embodiments, the script is a deterministic code segment that, when called, executes the set of instructions to generate an output. The notification to approve replacing the AI agent with a script may be the same as or similar to the script replacement notification 2314 as discussed in relation to FIG. 23. The UI may be the same as or similar to the UI 416 as discussed in relation to FIG. 4 above.

In operation 2412, an approval of the determination is received from the user via the UI. Further, in operation 2414, in response to receiving the approval, the script is generated. The script may be the same as or similar to script 2324 as discussed in relation to FIG. 23. In operation 2416, the AI agent is replaced with the script as the target of the trigger.

Computer System

Figure 25:
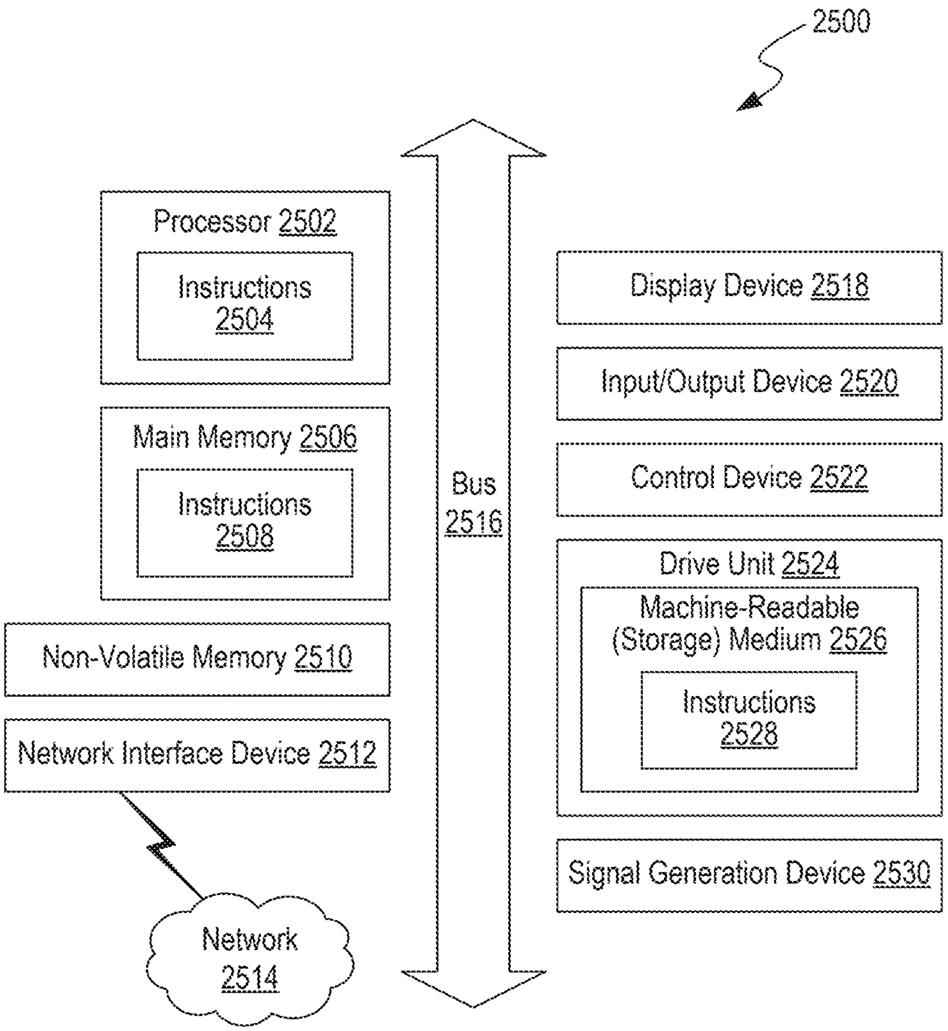
FIG. 25 is a block diagram that illustrates an example of a computer system in which at least some operations described herein can be implemented.

FIG. 25 is a block diagram that illustrates an example of a computer system 2500 in which at least some operations described herein can be implemented. As shown, the computer system 2500 can include: one or more processors 2502, main memory 2506, non-volatile memory 2510, a network interface device 2512, a display device 2518, an input/output device 2520, a control device 2522 (e.g., keyboard and pointing device), a drive unit 2524 that includes a machine-readable (storage) medium 2526, and a signal generation device 2530 that are communicatively connected to a bus 2516. The bus 2516 represents one or more physical buses and/or point-to-point connections that are connected by appropriate bridges, adapters, or controllers. Various common components (e.g., cache memory) are omitted from FIG. 25 for brevity. Instead, the computer system 2500 is intended to illustrate a hardware device on which components illustrated or described relative to the examples of the figures and any other components described in this specification can be implemented.

The computer system 2500 can take any suitable physical form. For example, the computer system 2500 can share a similar architecture as that of a server computer, personal computer (PC), tablet computer, mobile telephone, wearable electronic device, network-connected ("smart") device (e.g., a television or home assistant device), augmented reality/virtual reality (AR/VR) system (e.g., head-mounted display), or any electronic device capable of executing a set of instructions that specify action(s) to be taken by the computer system 2500. In some implementations, the computer system 2500 can be an embedded computer system, a system-on-chip (SOC), a single-board computer (SBC) system, or a distributed system such as a mesh of computer systems or include one or more cloud components in one or more networks. Where appropriate, one or more computer systems 2500 can perform operations in real time, near real time, or in batch mode.

The network interface device 2512 enables the computer system 2500 to mediate data in a network 2514 with an entity that is external to the computer system 2500 through any communication protocol supported by the computer system 2500 and the external entity. Examples of the network interface device 2512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 2506, non-volatile memory 2510, machine-readable medium 2526) can be local, remote, or distributed. Although shown as a single medium, the machine-readable medium 2526 can include multiple media (e.g., a centralized/distributed database and/or associated caches and servers) that store one or more sets of instructions 2528. The machine-readable medium 2526 can include any medium that is capable of storing, encoding, or carrying a set of instructions for execution by the computer system 2500. The machine-readable medium 2526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 2510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 2504, 2508, 2528) set at various times in various memory and storage devices in computing device(s). When read and executed by the processor 2502, the instruction(s) cause the computer system 2500 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," or any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. One or more non-transitory, computer-readable storage media comprising instructions recorded thereon, wherein the instructions, when executed by at least one data processor of a system, cause the system to:

configure an automation for a first artificial intelligence (AI) agent, wherein the automation includes a trigger that automatically initiates a call of the first AI agent, wherein calling the first AI agent causes the first AI agent to execute a first set of instructions, the first set of instructions including an instruction to execute a tool for modifying a database within a workspace application, and wherein the trigger is an action performed within either the workspace application or a third-party application;

detect an occurrence of the trigger;

in response to detecting the occurrence of the trigger, call the first AI agent and provide context associated with the trigger to the first AI agent;

receive, from the first AI agent, an output resulting from execution of the first set of instructions by the first AI agent, wherein the first AI agent generates the output by: (i) determining a semantic meaning of the context associated with the trigger, (ii) comparing the semantic meaning to one or more descriptions associated with one or more tools from a set of tools, (iii) based on the comparing, determining a list of usable tools from the set of tools for modifying the database, (iv) based on the list of usable tools and the semantic meaning, generating a first plan including the first set of instructions, and (v) executing one or more instructions from the first set of instructions, and wherein the output includes a modification to the database;

direct a second AI agent to determine whether the output indicates a successful execution of the first set of instructions;

upon receiving an indication from the second AI agent that the output is an unsuccessful execution of the first set of instructions:

cause display, via a user interface, of a notification of unsuccessful execution; and upon receiving an indication from the second AI agent that the output is a successful execution of the first set of instructions:

cause display, via the user interface, of the output.

2. The one or more non-transitory, computer-readable storage media of claim 1, further comprising instructions causing the system to, upon receiving the indication from the second AI agent that the output is an unsuccessful execution of the first set of instructions:

direct the second AI agent to generate a solution proposal for remedying the unsuccessful execution of the first set of instructions, wherein the solution proposal is associated with a second set of instructions; and cause display, via the user interface, of the solution proposal.

3. The one or more non-transitory, computer-readable storage media of claim 2, further comprising instructions causing the system to, upon receiving the indication from the second AI agent that the output is an unsuccessful execution of the first set of instructions:

receive from a user, via the user interface, an approval of the solution proposal; and direct at least one of the first AI agent or the second AI agent to execute the second set of instructions.

4. The one or more non-transitory, computer-readable storage media of claim 1, wherein:

the automation further includes an integration, the integration includes a set of access permissions for the first AI agent and a set of tools executable by the first AI agent, the set of access permissions is based on an access permission of a user, and the set of tools includes the tool for modifying the database and a tool for interacting with the third-party application.

5. The one or more non-transitory, computer-readable storage media of claim 1, wherein the trigger is an emoji reaction, a text message, a thread creation, a mention, or a support ticket creation.

6. A system comprising:

at least one hardware processor; and at least one non-transitory memory storing instructions, which, when executed by the at least one hardware processor, cause the system to:

configure an automation for a first artificial intelligence (AI) agent, wherein the automation includes a trigger that automatically initiates a call of the first AI agent, and wherein calling the first AI agent causes the first AI agent to execute a first set of instructions;

detect an occurrence of the trigger;

in response to detecting the occurrence of the trigger, call the first AI agent and provide context associated with the trigger to the first AI agent; and receive, from the first AI agent, an output resulting from execution of the first set of instructions by the first AI agent, wherein the first AI agent generates the output by: (i) determining a semantic meaning of the context associated with the trigger, (ii) comparing the semantic meaning to one or more descriptions associated with one or more tools from a set of tools, (iii) based on the comparing, determining a list of usable tools from the set of tools for modifying a database, (iv) based on the list of usable tools and the semantic meaning, generating a first plan including the first set of instructions, and (v) executing one or more instructions from the first set of instructions.

7. The system of claim 6, further comprising instructions causing the system to:

direct a second AI agent to determine whether the output indicates a successful execution of the first set of instructions;

upon receiving an indication from the second AI agent that the output is an unsuccessful execution of the first set of instructions:

cause display, via a user interface, of a notification of unsuccessful execution; and upon receiving an indication from the second AI agent that the output is a successful execution of the first set of instructions:

cause display, via the user interface, of the output.

8. The system of claim 7, further comprising instructions causing the system to, upon receiving the indication from the second AI agent that the output is an unsuccessful execution of the first set of instructions:

direct the second AI agent to generate a solution proposal for remedying the unsuccessful execution of the first set of instructions, wherein the solution proposal is associated with a second set of instructions; and cause display, via the user interface, of the solution proposal.

9. The system of claim 8, further comprising instructions causing the system to, upon receiving the indication from the second AI agent that the output is an unsuccessful execution of the first set of instructions:

receive from a user, via the user interface, an approval of the solution proposal; and direct at least one of the first AI agent or the second AI agent to execute the second set of instructions.

10. The system of claim 6, wherein:

the first set of instructions includes an instruction to execute a tool for modifying a database within a workspace application, and the output includes a modification to the database.

11. The system of claim 6, wherein the trigger is an action performed within either a workspace application or a third-party application.

12. A method comprising:

configuring an automation for a first artificial intelligence (AI) agent, wherein the automation includes a trigger that automatically initiates a call of the first AI agent, and wherein calling the first AI agent causes the first AI agent to execute a first set of instructions;

detecting an occurrence of the trigger;

in response to detecting the occurrence of the trigger, calling the first AI agent and provide context associated with the trigger to the first AI agent; and receiving, from the first AI agent, an output resulting from execution of the first set of instructions by the first AI agent, wherein the first AI agent generates the output by: (i) determining a semantic meaning of the context associated with the trigger, (ii) comparing the semantic meaning to one or more descriptions associated with one or more tools from a set of tools, (iii) based on the comparing, determining a list of usable tools from the set of tools for modifying a database, (iv) based on the list of usable tools and the semantic meaning, generating a first plan including the first set of instructions, and (v) executing one or more instructions from the first set of instructions.

13. The method of claim 12, further comprising:

directing a second AI agent to determine whether the output indicates a successful execution of the first set of instructions;

upon receiving an indication from the second AI agent that the output is an unsuccessful execution of the first set of instructions:

causing display, via a user interface, of a notification of unsuccessful execution; and upon receiving an indication from the second AI agent that the output is a successful execution of the first set of instructions:

causing display, via the user interface, of the output.

14. The method of claim 13, further comprising, upon receiving the indication from the second AI agent that the output is an unsuccessful execution of the first set of instructions:

directing the second AI agent to generate a solution proposal for remedying the unsuccessful execution of the first set of instructions, wherein the solution proposal is associated with a second set of instructions; and causing display, via the user interface, of the solution proposal.

15. The method of claim 14, further comprising, upon receiving the indication from the second AI agent that the output is an unsuccessful execution of the first set of instructions:

receiving from a user, via the user interface, an approval of the solution proposal; and directing at least one of the first AI agent or the second AI agent to execute the second set of instructions.

16. The method of claim 12, wherein:

the automation further includes an integration, the integration includes a set of access permissions for the first AI agent and a set of tools executable by the first AI agent, the set of access permissions is based on an access permission of a user, and the set of tools includes a tool for modifying a database and a tool for interacting with a third-party application.

17. The method of claim 12, wherein:

the first set of instructions includes an instruction to execute a tool for modifying a database within a workspace application, and the output includes a modification to the database.

18. The method of claim 12, wherein the trigger is an action performed within either a workspace application or a third-party application.

* * * * *